(12) United States Patent
Bradley et al.

(10) Patent No.: US 8,668,035 B2
(45) Date of Patent: *Mar. 11, 2014

(54) ELECTRIC TRACTION SYSTEM AND METHOD

(75) Inventors: Bill C. Bradley, Dallas, TX (US); Joel Craig Diehl, Austin, TX (US); Dan Harris, Aurora, CO (US); Warner Allen Harris, Aurora, CO (US); Warner Olan Harris, Banning, CA (US); Peter Nortman, Monrovia, CA (US); Wayne Turnbow, Centennial, CO (US)

(73) Assignee: Clean Emissions Technologies, Inc., Eastland, TX (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/933,415

(22) PCT Filed: Aug. 8, 2008

(86) PCT No.: PCT/US2008/072672
§ 371 (c)(1),
(2), (4) Date: Sep. 18, 2010

(87) PCT Pub. No.: WO2009/117016
PCT Pub. Date: Sep. 24, 2009

(65) Prior Publication Data
US 2011/0031050 A1    Feb. 10, 2011

Related U.S. Application Data

(63) Continuation-in-part of application No. 11/374,709, filed on Mar. 14, 2006, now Pat. No. 7,543,454, and a
(Continued)

(51) Int. Cl.
*B60K 6/42*        (2007.10)

(52) U.S. Cl.
USPC ...... 180/65.22; 180/165; 180/54.1; 180/53.5; 180/53.7

(58) Field of Classification Search
USPC ........ 180/53.6, 53.61, 53.62, 53.7, 165, 54.1, 180/65.25, 65.26, 65.29, 65.31; 701/22, 53, 701/54
See application file for complete search history.

(56) References Cited

U.S. PATENT DOCUMENTS

| 1,726,760 A | 9/1929 | Otwell |
| 2,467,398 A | 4/1949 | Miller |

(Continued)

FOREIGN PATENT DOCUMENTS

| DE | 4204384 A1 | 8/1993 |
| DE | 19528629 A1 | 2/1997 |

(Continued)

OTHER PUBLICATIONS

Broderick et al., "Demonstration of Proton Exchange Membrane Fuel Cell as an Auxiliary Power Source for Heavy Trucks," SAE Transactions, 2000, vol. 109, Previously Presented 783-788, NY, NY.

(Continued)

*Primary Examiner* — John Walters
*Assistant Examiner* — James Triggs
(74) *Attorney, Agent, or Firm* — Kelly Kordzik; Matheson Keys & Kordzik PLLC

(57) ABSTRACT

A power exchange unit (PXU) is coupled to an existing manual transmission of a vehicle via a PTO port. An electric motor generator coupled to the PXU. A battery is electrically coupled to the motor generator for supplying power to propel the vehicle. A control unit is coupled to the motor generator and the battery and configured to switch operation of the vehicle between first and second modes, wherein in the first mode an internal combustion engine of the vehicle propels the vehicle, and in the second mode the motor generator propels the vehicle in a motoring mode.

25 Claims, 11 Drawing Sheets

Related U.S. Application Data

(63) continuation-in-part of application No. 11/558,786, filed on Nov. 10, 2006, now Pat. No. 7,600,595, and a continuation-in-part of application No. 12/060,368, filed on Apr. 1, 2008, now Pat. No. 7,921,945.

(60) Provisional application No. 61/037,851, filed on Mar. 19, 2008.

(56) References Cited

U.S. PATENT DOCUMENTS

| | | | |
|---|---|---|---|
| 2,677,251 A | 5/1954 | Clark et al. | |
| 2,810,293 A | 10/1957 | George | |
| 2,923,171 A | 2/1960 | George | |
| 2,930,242 A | 3/1960 | George | |
| 3,209,604 A | 10/1965 | Mitchell | |
| 3,241,628 A | 3/1966 | Thomas | |
| 3,597,935 A | 8/1971 | Pierrat | |
| 3,599,814 A | 8/1971 | Brownfield | |
| 3,646,773 A | 3/1972 | Falk | |
| 3,716,768 A | 2/1973 | Mason | |
| 3,792,327 A | 2/1974 | Waldorf | |
| 3,882,950 A | 5/1975 | Strohlein | |
| 4,193,271 A | 3/1980 | Honigsbaum | |
| 4,271,677 A | 6/1981 | Harr | |
| 4,280,330 A | 7/1981 | Harris | |
| 4,438,342 A | 3/1984 | Kenyon | |
| 4,448,157 A | 5/1984 | Eckstein | |
| 4,461,988 A | 7/1984 | Plunkett | |
| 4,470,476 A | 9/1984 | Hunt | |
| 4,531,379 A | 7/1985 | Diefenthaler, Jr. | |
| 4,588,040 A | 5/1986 | Albright, Jr. | |
| 4,658,599 A | 4/1987 | Kajiwara | |
| 4,711,204 A | 12/1987 | Rusconi | |
| 4,712,636 A | 12/1987 | Ishimatsu | |
| 4,732,229 A | 3/1988 | Lucht | |
| 4,825,663 A | 5/1989 | Nijjar | |
| 4,828,452 A | 5/1989 | Bolitho | |
| 4,846,327 A | 7/1989 | Mayer | |
| 4,947,657 A | 8/1990 | Kalmbach | |
| 4,976,114 A | 12/1990 | Manning | |
| RE33,687 E | 9/1991 | Greer | |
| 5,046,326 A | 9/1991 | Havemann | |
| 5,048,657 A | 9/1991 | Dissett | |
| 5,190,118 A | 3/1993 | Yelton | |
| 5,255,733 A | 10/1993 | King | |
| 5,267,635 A | 12/1993 | Peterson | |
| 5,307,645 A | 5/1994 | Pannell | |
| 5,343,970 A | 9/1994 | Severinsky | |
| 5,346,031 A | 9/1994 | Gardner | |
| 5,522,778 A | 6/1996 | Iwase | |
| 5,558,588 A | 9/1996 | Schmidt | |
| 5,631,532 A | 5/1997 | Azuma et al. | |
| 5,637,987 A | 6/1997 | Fattic | |
| 5,644,200 A | 7/1997 | Yang | |
| 5,653,302 A | 8/1997 | Edye et al. | |
| 5,656,921 A | 8/1997 | Farrall | |
| 5,667,029 A | 9/1997 | Urban | |
| 5,669,842 A | 9/1997 | Schmidt | |
| 5,722,911 A | 3/1998 | Ibaraki | |
| 5,755,303 A | 5/1998 | Yamamoto | |
| 5,773,904 A | 6/1998 | Schiebold | |
| 5,775,449 A | 7/1998 | Moroto | |
| 5,799,632 A | 9/1998 | Bennett | |
| 5,799,744 A | 9/1998 | Yamaguchi | |
| 5,801,499 A | 9/1998 | Tsuzuki | |
| 5,806,617 A | 9/1998 | Yamaguchi | |
| 5,810,321 A | 9/1998 | Presson | |
| 5,815,824 A | 9/1998 | Saga | |
| 5,823,282 A | 10/1998 | Yamaguchi | |
| 5,841,201 A | 11/1998 | Tabata | |
| 5,842,534 A | 12/1998 | Frank | |
| 5,845,731 A | 12/1998 | Buglione | |
| 5,847,469 A | 12/1998 | Tabata | |
| 5,862,497 A | 1/1999 | Yano | |
| 5,881,564 A | 3/1999 | Kishimoto | |
| 5,887,670 A | 3/1999 | Tabata | |
| 5,896,750 A | 4/1999 | Karl | |
| 5,942,879 A | 8/1999 | Ibaraki | |
| 5,951,614 A | 9/1999 | Tabata | |
| 6,038,877 A | 3/2000 | Peiffer | |
| 6,059,059 A | 5/2000 | Schmidt-Brucken | |
| 6,080,081 A | 6/2000 | Sauermann | |
| 6,138,788 A | 10/2000 | Bohner | |
| 6,151,891 A | 11/2000 | Bennett | |
| 6,155,364 A | 12/2000 | Nagano | |
| 6,164,400 A | 12/2000 | Jankovic | |
| 6,209,672 B1 | 4/2001 | Severinsky | |
| 6,238,814 B1 | 5/2001 | Horiguchi et al. | |
| 6,269,713 B1 | 8/2001 | Ohke | |
| 6,276,161 B1 | 8/2001 | Peiffer | |
| 6,318,486 B2 | 11/2001 | Masaki | |
| 6,332,257 B1 * | 12/2001 | Reed et al. | 29/401.1 |
| 6,338,391 B1 | 1/2002 | Severinsky | |
| 6,340,339 B1 | 1/2002 | Tabata | |
| 6,351,957 B2 | 3/2002 | Hara et al. | |
| 6,367,570 B1 | 4/2002 | Long, III | |
| 6,405,818 B1 | 6/2002 | Anthony | |
| 6,419,040 B2 | 7/2002 | Kitano | |
| 6,427,100 B1 | 7/2002 | Kaku | |
| 6,441,506 B2 | 8/2002 | Nakashima | |
| 6,480,767 B2 | 11/2002 | Yamaguchi | |
| 6,484,831 B1 | 11/2002 | Gauthier | |
| 6,488,345 B1 | 12/2002 | Woody | |
| 6,488,609 B1 | 12/2002 | Morimoto | |
| 6,519,513 B2 | 2/2003 | Nakagawa | |
| 6,520,160 B2 | 2/2003 | Kojima | |
| 6,554,088 B2 | 4/2003 | Severinsky | |
| 6,557,655 B2 | 5/2003 | Ovshinsky | |
| 6,558,290 B2 | 5/2003 | Phillips | |
| 6,558,827 B1 | 5/2003 | Reiser | |
| 6,570,265 B1 | 5/2003 | Shiraishi | |
| 6,616,569 B2 | 9/2003 | Hoang | |
| 6,629,027 B2 | 9/2003 | Yamaguchi | |
| 6,651,759 B1 | 11/2003 | Gruenwald | |
| 6,655,488 B2 | 12/2003 | Braud | |
| 6,658,852 B2 | 12/2003 | Frey | |
| 6,664,651 B1 | 12/2003 | Kotre et al. | |
| 6,672,415 B1 | 1/2004 | Tabata | |
| 6,687,603 B2 | 2/2004 | Wakashiro | |
| 6,688,411 B2 | 2/2004 | Boggs | |
| 6,692,403 B2 | 2/2004 | Charaudeau | |
| 6,694,232 B2 | 2/2004 | Saito | |
| 6,705,416 B1 | 3/2004 | Glonner | |
| 6,712,165 B1 | 3/2004 | Okazaki | |
| 6,721,637 B2 | 4/2004 | Abe | |
| 6,735,502 B2 | 5/2004 | Phillips | |
| 6,740,987 B2 | 5/2004 | Kitajima | |
| 6,745,117 B1 | 6/2004 | Thacher | |
| 6,768,932 B2 | 7/2004 | Claypole | |
| 6,781,251 B2 | 8/2004 | Takaoka | |
| 6,787,932 B2 | 9/2004 | Takaoka | |
| 6,796,367 B2 | 9/2004 | Blacquiere | |
| 6,805,211 B2 | 10/2004 | Fujikawa | |
| 6,808,470 B2 | 10/2004 | Boll | |
| 6,840,341 B2 | 1/2005 | Fujikawa | |
| 6,851,470 B2 | 2/2005 | Laukhuf | |
| 6,857,985 B2 | 2/2005 | Williams | |
| 6,862,511 B1 | 3/2005 | Phillips | |
| 6,867,509 B1 | 3/2005 | Takaoka | |
| 6,868,927 B2 | 3/2005 | Boll | |
| 6,881,167 B2 | 4/2005 | Inada | |
| 6,892,541 B2 | 5/2005 | Suzuki | |
| 6,907,337 B2 | 6/2005 | Phillips | |
| 6,915,198 B2 | 7/2005 | Phillips | |
| 6,921,984 B2 | 7/2005 | Rogg | |
| 6,966,868 B2 | 11/2005 | Stork | |
| 6,986,645 B2 | 1/2006 | Iwanami | |
| 6,991,053 B2 | 1/2006 | Kuang | |
| 6,994,177 B2 | 2/2006 | Ito | |
| 6,994,360 B2 | 2/2006 | Kuang | |
| 6,998,727 B2 | 2/2006 | Gray | |
| 7,004,273 B1 | 2/2006 | Gruenwald | |
| 7,021,409 B2 | 4/2006 | Tamor | |

(56) References Cited

U.S. PATENT DOCUMENTS

| | | |
|---|---|---|
| 7,035,727 B2 | 4/2006 | De La Salle |
| 7,055,337 B2 | 6/2006 | Horn |
| 7,055,636 B2 | 6/2006 | Komiyama |
| 7,091,839 B2 | 8/2006 | Situ |
| 7,102,313 B2 | 9/2006 | Kadota |
| 7,104,347 B2 | 9/2006 | Severinsky |
| 7,104,920 B2 | 9/2006 | Beaty |
| 7,107,776 B2 | 9/2006 | Ikura |
| 7,111,704 B2 | 9/2006 | Johnson |
| 7,135,785 B2 | 11/2006 | Kropp |
| 7,143,851 B2 | 12/2006 | Masterson |
| 7,147,072 B2 | 12/2006 | Botti |
| 7,223,200 B2 | 5/2007 | Kojima |
| 7,237,634 B2 | 7/2007 | Severinsky |
| 7,240,749 B2 | 7/2007 | Bhavsar |
| 7,273,119 B2 | 9/2007 | Tsuneyoshi |
| 7,275,610 B2 | 10/2007 | Kuang |
| 7,285,869 B2 | 10/2007 | Syed |
| 7,301,302 B2 | 11/2007 | Yoshii |
| 7,306,064 B2 | 12/2007 | Imazu |
| 7,315,090 B2 | 1/2008 | Yang |
| 7,392,871 B2 | 7/2008 | Severinsky |
| 7,407,026 B2 | 8/2008 | Tamor |
| 7,455,134 B2 | 11/2008 | Severinsky |
| 7,469,758 B2 | 12/2008 | Iwanaka |
| 7,469,858 B2 | 12/2008 | Edelson |
| 7,487,852 B2 | 2/2009 | Leone |
| 7,497,198 B2 | 3/2009 | Leone |
| 7,506,711 B2 | 3/2009 | Usoro |
| 7,520,353 B2 | 4/2009 | Severinsky |
| 7,543,454 B2 | 6/2009 | Harris |
| 7,551,064 B2 | 6/2009 | Pudelko et al. |
| 7,559,388 B2 | 7/2009 | Severinsky |
| 7,580,808 B2 | 8/2009 | Bos |
| 7,600,595 B2 | 10/2009 | Harris |
| 2001/0022245 A1 | 9/2001 | Rogg |
| 2001/0039230 A1 | 11/2001 | Severinsky |
| 2002/0040818 A1 | 4/2002 | Maruyama |
| 2003/0041684 A1* | 3/2003 | Jones, Jr. .................. 74/473.15 |
| 2003/0062205 A1 | 4/2003 | Konrad |
| 2003/0162631 A1 | 8/2003 | Williams |
| 2003/0217876 A1 | 11/2003 | Severinsky |
| 2004/0093264 A1 | 5/2004 | Shimizu |
| 2004/0157704 A1 | 8/2004 | Stork |
| 2004/0160319 A1 | 8/2004 | Joao |
| 2004/0200648 A1 | 10/2004 | Tarasinski |
| 2004/0207205 A1 | 10/2004 | Kikuchi |
| 2005/0060076 A1 | 3/2005 | Phillips |
| 2005/0060079 A1 | 3/2005 | Phillips |
| 2005/0060080 A1 | 3/2005 | Phillips |
| 2005/0107198 A1 | 5/2005 | Sowul et al. |
| 2005/0109550 A1 | 5/2005 | Buglione |
| 2005/0113202 A1 | 5/2005 | Miller |
| 2005/0211479 A1 | 9/2005 | Tamor |
| 2005/0224264 A1 | 10/2005 | Perrin |
| 2005/0251299 A1 | 11/2005 | Donnelly et al. |
| 2006/0100057 A1 | 5/2006 | Severinsky |
| 2006/0108161 A1 | 5/2006 | Feliss |
| 2006/0207274 A1 | 9/2006 | Harris |
| 2006/0213704 A1 | 9/2006 | Mack |
| 2006/0231304 A1 | 10/2006 | Severinsky |
| 2006/0231305 A1 | 10/2006 | Severinsky |
| 2006/0231306 A1 | 10/2006 | Severinsky |
| 2006/0237246 A1 | 10/2006 | Severinsky |
| 2006/0237247 A1 | 10/2006 | Severinsky |
| 2006/0258505 A1 | 11/2006 | Vafidis |
| 2007/0030450 A1 | 2/2007 | Liang |
| 2007/0056784 A1 | 3/2007 | Joe |
| 2007/0080005 A1 | 4/2007 | Joe |
| 2007/0107956 A1 | 5/2007 | Matsubara |
| 2007/0107958 A1 | 5/2007 | Oliver |
| 2007/0124037 A1 | 5/2007 | Moran |
| 2007/0137909 A1 | 6/2007 | Zillmer et al. |
| 2007/0169970 A1 | 7/2007 | Kydd |
| 2007/0181355 A1 | 8/2007 | Harris |
| 2007/0246274 A1 | 10/2007 | Dreibholz |
| 2007/0272456 A1 | 11/2007 | Shiiba |
| 2007/0278022 A1 | 12/2007 | Tanishima |
| 2008/0000700 A1 | 1/2008 | Kotani |
| 2008/0006467 A1 | 1/2008 | Morishita |
| 2008/0012535 A1 | 1/2008 | Takatsuji |
| 2008/0029319 A1* | 2/2008 | Fleckner et al. ............. 180/65.2 |
| 2008/0029320 A1 | 2/2008 | Fleckner |
| 2008/0076616 A1 | 3/2008 | Kidokoro |
| 2008/0096711 A1 | 4/2008 | Smith |
| 2008/0220933 A1 | 9/2008 | Maeda |
| 2008/0236912 A1 | 10/2008 | Ueoka |
| 2008/0243324 A1 | 10/2008 | Harris |
| 2008/0288132 A1 | 11/2008 | King et al. |
| 2009/0018716 A1* | 1/2009 | Ambrosio ....................... 701/22 |
| 2009/0024267 A1 | 1/2009 | Kawai |
| 2009/0030568 A1 | 1/2009 | Amano |
| 2009/0095549 A1 | 4/2009 | Dalum |
| 2009/0107744 A1 | 4/2009 | Foersterling |
| 2009/0177345 A1 | 7/2009 | Severinsky |
| 2009/0254241 A1 | 10/2009 | Basir |

FOREIGN PATENT DOCUMENTS

| | | |
|---|---|---|
| EP | 0492152 | 7/1992 |
| EP | 0645271 | 3/1995 |
| EP | 1068976 B1 | 1/2001 |
| EP | 1140533 | 1/2003 |
| EP | 1297982 A2 | 4/2003 |
| EP | 0784743 | 5/2003 |
| EP | 1759915 | 3/2009 |
| FR | 2699127 | 6/1994 |
| FR | 2910101 | 6/2008 |
| JP | 03239631 A3 | 10/1991 |
| JP | 07195955 | 8/1995 |
| JP | 07240213 | 9/1995 |
| JP | 11146502 | 5/1999 |
| JP | 11-299004 | 10/1999 |
| JP | 200023301 A | 1/2000 |
| JP | 2000-337238 | 12/2000 |
| JP | 2001-105910 | 4/2001 |
| JP | 2001-190007 | 7/2001 |
| JP | 2002118903 | 4/2002 |
| JP | 2002-247712 | 8/2002 |
| JP | 2004017890 | 1/2004 |
| JP | 2004136743 | 5/2004 |
| JP | 2004236609 | 8/2004 |
| JP | 2004318370 | 11/2004 |
| KR | 20-1999-0000074 | 1/1999 |
| KR | 10-2004-0000730 | 1/2001 |
| KR | 20-0217389 | 3/2001 |
| WO | WO 0075532 A1 | 12/2000 |
| WO | WO2004062957 A1 | 7/2004 |
| WO | WO200503600 A1 | 1/2005 |
| WO | WO2006038968 | 4/2006 |
| WO | WO2006099427 A2 | 9/2006 |
| WO | WO2007030069 A1 | 3/2007 |
| WO | WO2007097819 A2 | 8/2007 |
| WO | WO2009086135 A2 | 7/2009 |

OTHER PUBLICATIONS http://www.gears-manufacturers.com/power-take-offs.html; "Power Take-Offs," 3 pages.
European Search Report dated Nov. 23, 2009, Application No. 06850144.4-2207/199439, 6 pages.
International Preliminary Report on Patentability dated Mar. 9, 2009, Application No. PCT/US06/60833, 12 pages.
International Search Report and Written Opinion Dated Mar. 20, 2008, Application No. PCT/US06/60833, 9 pages.
International Search Report and Written Opinion Dated Nov. 5, 2008, Application No. PCT/US2008/072672, 6 pages.
International Search Report and Written Opinion dated May 14, 2009, Application No. PCT/US2009/036904, 14 pages.
International Search Report and Written Opinion dated Jun. 12, 2009, Application No. PCT/US2009/038938, 12 pages.
Palumbo, Anthony J., et al, "Ultracapacitor Based Hybrid Booster Drive," 20th International Electric Vehicle Symposium and Exposi-

(56) References Cited

OTHER PUBLICATIONS tion (EVS 20): Powering Sustainable Transportation, Aug. 2003, revised Jun. 2004, 16 pages.
Southwest Research Institute, "Fuel cell-assisted truck completes cross-country trek," http://wwww.swri.org/9what/releases/2005/fuelcell.htm, May 26, 2005, SwRI, San Antonio, TX.
U.S. Army Public Affairs Office, "TARDEC Sponsors Cross-Country Fuel Cell Truck Expedition." RDECOM Magazine, Jul. 2005, p. 6, Aberdeen Proving Ground, MD.
Search and Examination Report, Singapore Patent Application No. 200805771-3, Oct. 29, 2010, 12 pages.
Office Action, China Patent Application No. 200680053009.2, Nov. 3, 2010, 4 pages.
International Search Report and Written Opinion of the International Searching Authority, International Application No. PCT/US2010/028978, dated Dec. 15, 2010.
First Office Action, Japanese Patent Application No. 2008-556310 dated Apr. 5, 2011, 7 pages.
English language Abstract prepared by Japanese Patent Office, Publication No. 2002-247712, date of publication Aug. 30, 2002.
English language Abstract prepared by Japanese Patent Office, Publication No. 2001-105910, date of publication Apr. 17, 2001.
International Preliminary Report on Patentability, Written Opinion of the International Searching Authority, International Application No. PCT/US2009/036904, dated Sep. 21, 2010.
European Search Report, Application No. EP 11164435; dated Jun. 20, 2011.
United States Patent and Trademark Office, Office Action, U.S. Appl. No. 12/469,493, dated Jun. 10, 2011.
Korean Intellectual Property Office, Notice to File A Response, Preliminary Rejection, Patent Application No. 10-2010-7023374 dated Jan. 11, 2011.
International Search Report and Written Opinion from the International Searching Authority, PCT/US2010/047819, mailed Oct. 28, 2010, 8 pages.
Korean Intellectual Property Office, Notice to File A Response, Preliminary Rejection, Patent Application No. 10-2010-7023374 dated Jul. 11, 2011.
Memo Concerning The Official Action Reported in the Covering Letter, Mexican Patent Application No. MX/a/2010/010249, 4 pages.
English Translation of Office Action for Taiwan Invention Patent Application No. 096105113 dated Jun. 29, 2011, 17 pages.
European Examination Report; Application No. 09728436.8-2421; dated Sep. 1, 2011.
International Preliminary Report on Patentability and Written Opinion of the International Searching Authority; International Application No. PCT/US2010/028978, dated Sep. 13, 2011, 13 pages.
European Patent Office, Examination Report, Application No. 08797526.4, dated Oct. 12, 2011.
European Patent Office, Search Report, Application No. 08797526.4, dated Sep. 30, 2011.
Translation of EP 0 492 152 A1, European Patent Application No. 91120122.6, filing date Nov. 26, 1991.
European Patent Office, Patent Abstracts of Japan, Publication No. 2004-136743.
Decision on Rejection, Application No. 2008-556310, Apr. 24, 2012.
International Bureau of WIPO; International Preliminary Report on Patentability, PCT/US2010/047819, Mar. 15, 2012, 7 pages.
Hungarian Intellectual Property Office, Search Report and Written Opinion, Application No. 201006777-5, dated May 25, 2012, 14 pages.
United States Patent & Trademark Office, Non-Final Rejection, U.S. Appl. No. 12/874,838, dated Dec. 5, 2012.
Canadian Intellectual Property Office, Examination Report, Application No. 2,643,165, dated Oct. 24, 2012.
Japanese Patent Office, Notice of Reasons for Rejection, Japanese Patent Application No. 2011-500758, dated Oct. 23, 2012.
Mexican Patent Office, Memo Concerning the Official Action Reported in the Covering Letter; Mexican Patent Application No. MX/a/2010/010249, 5 pages, dated Nov. 27, 2012.
Mexican Patent Office, Memo Concerning The Official Action Reported in the Covering Letter; Mexican Patent Application No. MX/a/2010/010249, 8 pages, dated Apr. 10, 2012.
The State Intellectual Property Office of the People'S Republic of China, Notice on the First Office Action, Application No. 200980110599.1, dated May 21, 2012.
Intellectual Property Office of Singapore, Search and Examination Report, Singapore Patent Application No. 201007209-8, Aug. 1, 2012.
Korean Intellectual Property Office, Notice to File A Response, Patent Application No. 10-2008-7022954, Sep. 7, 2012.
English Translation, Japanese Patent Application Laid-Open No. 2004-17890 (P2004-17890A), Laid-Open date Jan. 22, 2004.

\* cited by examiner

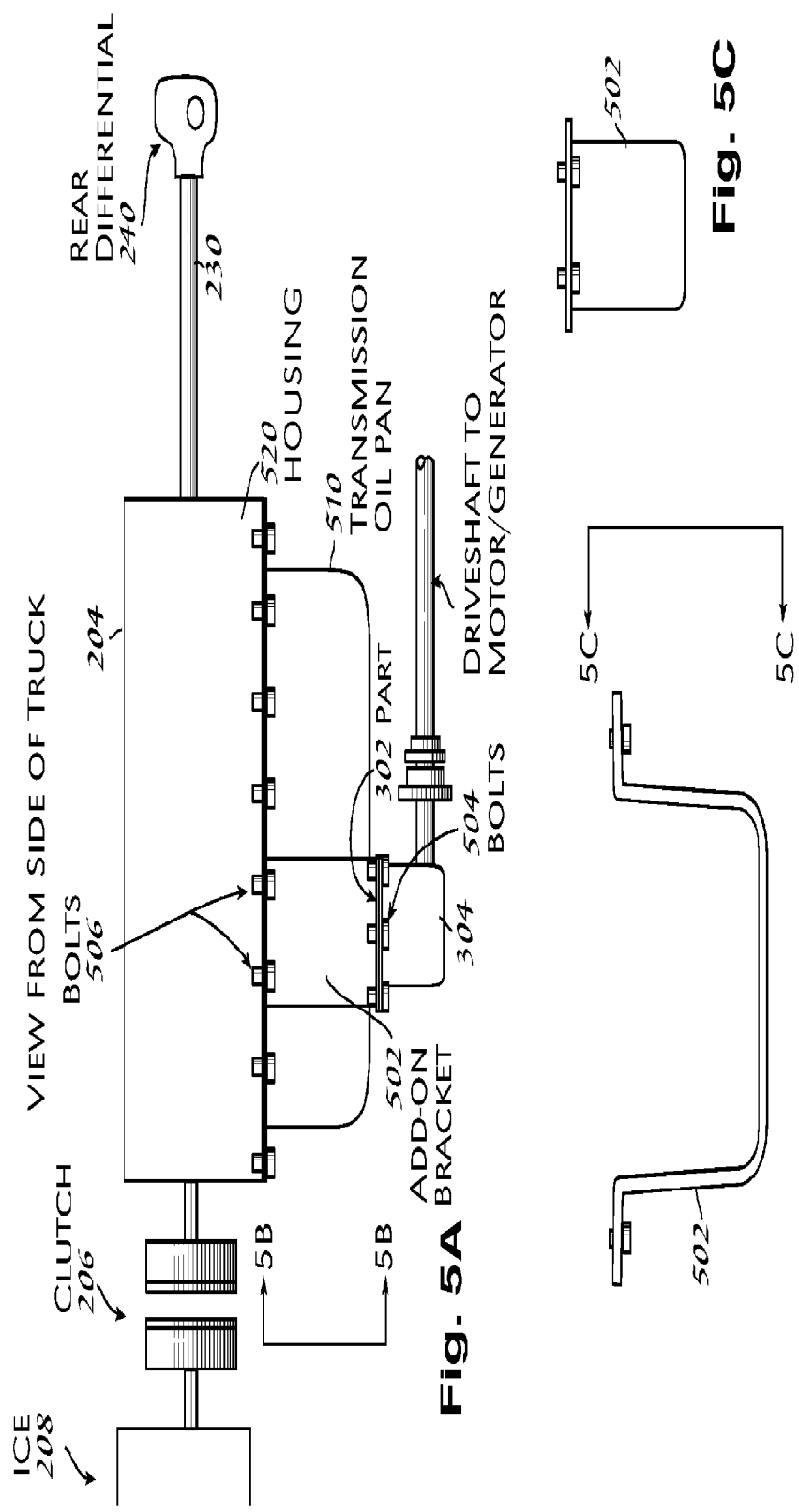

ELECTRIC TRACTION SYSTEM AND METHOD

RELATED APPLICATIONS

This application claims the benefit of the priority to U.S. Provisional Application No. 61/037,851, filed Mar. 19, 2008. This application is a continuation-in-part application of the following applications: application Ser. No. 11/374,709, filed Mar. 14, 2006; application Ser. No. 11/558,786, filed Nov. 10, 2006; and application Ser. No. 12/060,368, filed Apr. 1, 2008. All of these applications are hereby incorporated by reference herein.

TECHNICAL FIELD

This application relates to an electric propulsion system, i.e., traction system, on a vehicle, including the retrofit installation of such a system.

BRIEF DESCRIPTION OF DRAWINGS

FIGS. 5A-5D are diagrams of a bracket of disclosed embodiments;

Like reference symbols in the various drawings indicate like elements.

DETAILED DESCRIPTION

Figure 1A:
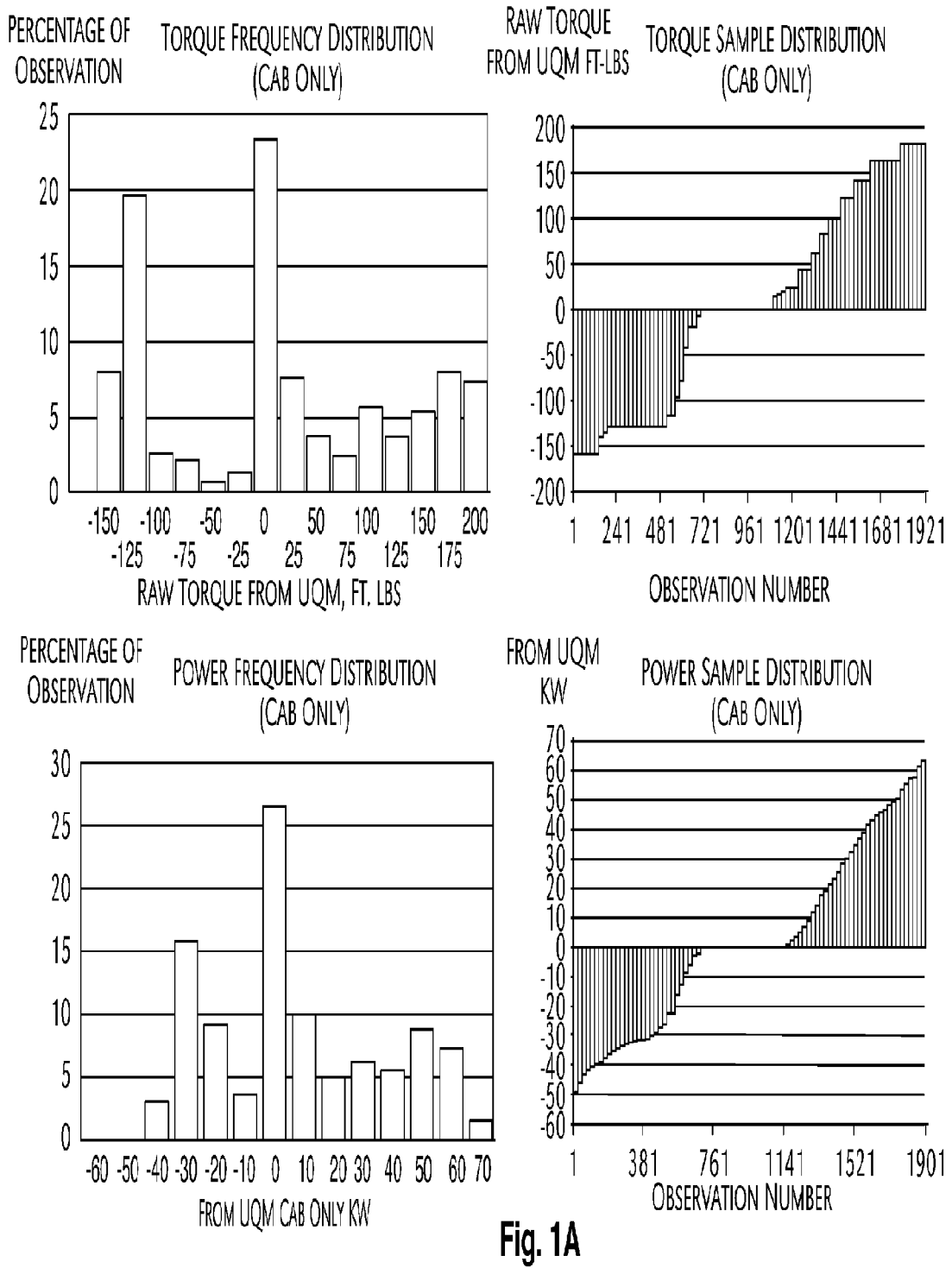
FIGS. 1A and 1B are graphs of driving test results of a vehicle having an embodiment of an electric traction system installed thereon.

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

The present invention, in one aspect, employs an access port of a vehicle's transmission (also referred to as a power take-off port ("PTO port")) in a more robust arrangement, which enables, among other things, a transition methodology applicable to the current class 8 heavy duty vehicle (HDV) fleet of over 3,000,000 U.S. trucks, with a view to federally mandated emission regulations. That is, in one aspect, a retrofit system of the present invention is applicable to HDV's and has a 10 to 15 year life cycle that reduces emissions and fuel consumption within real world constraints. This is achieved by methods and technology that are adapted not only to the diverse and aging hardware of the existing fleet, but also adapted to the economically fragile ownership structure of those trucks.

In one embodiment of the present invention, a retrofit arrangement is provided for a conventional HDV that enables operation in a single driving session in both i) an internal combustion engine (ICE) mode, in which the ICE provides power out of a conventional PTO port to an added-on electric traction motor-generator (ETMG) via a controller, and thereby mechanically powers the ETMG as a generator to produce and store an electrical charge in a large battery, and ii) an electric traction motor mode (or simply "ET mode"), in which the ICE is shut off and the stored charge from the battery is delivered back (through the controller and the same ETMG), thereby electrically powering the ETMG as a motor to provide mechanical power into the same PTO port for independently propelling the vehicle. In another aspect, the controller is configured to automatically switch the HDV between ICE and ET modes responsive to driving and battery conditions. For example, in an embodiment of the invention, the controller automatically starts the HDV in ET mode and automatically switches it to ICE mode responsive to the speed of the vehicle reaching a certain upper limit, where the upper limit may be in the range of 15 to 30 MPH, for example, depending upon the load on the vehicle. Correspondingly, the controller automatically switches the HDV to ET mode, again responsive to the speed of the HDV falling below the limit. This automatic switching may occur numerous times during a single driving session.

Herein the term "traction" may be used interchangeably with the term "propulsion."

A "driving session," as the term is used herein, refers to a trip from a departure point to an arrival point, and may include the return trip. For a day truck in the Los Angeles port region, for example, this may include a day's driving, such as, for example, starting up of the vehicle at a carrier's yard, driving on city streets to a port, waiting at the port to load (which may involve a long interval of creeping slowly in line), departing from the port, driving on city streets to a delivery point, and returning to the yard. (Of course, it could alternatively include driving first from the yard on city streets to a pick up point and then driving to port, waiting at the port to unload, departing from the port, driving on city streets to a delivery point, and returning to the yard.) It may include no trips to the port or more than one trip to the port in a day. It may include more than one pick up point and more than one delivery point in a single day.

Figure 1B:
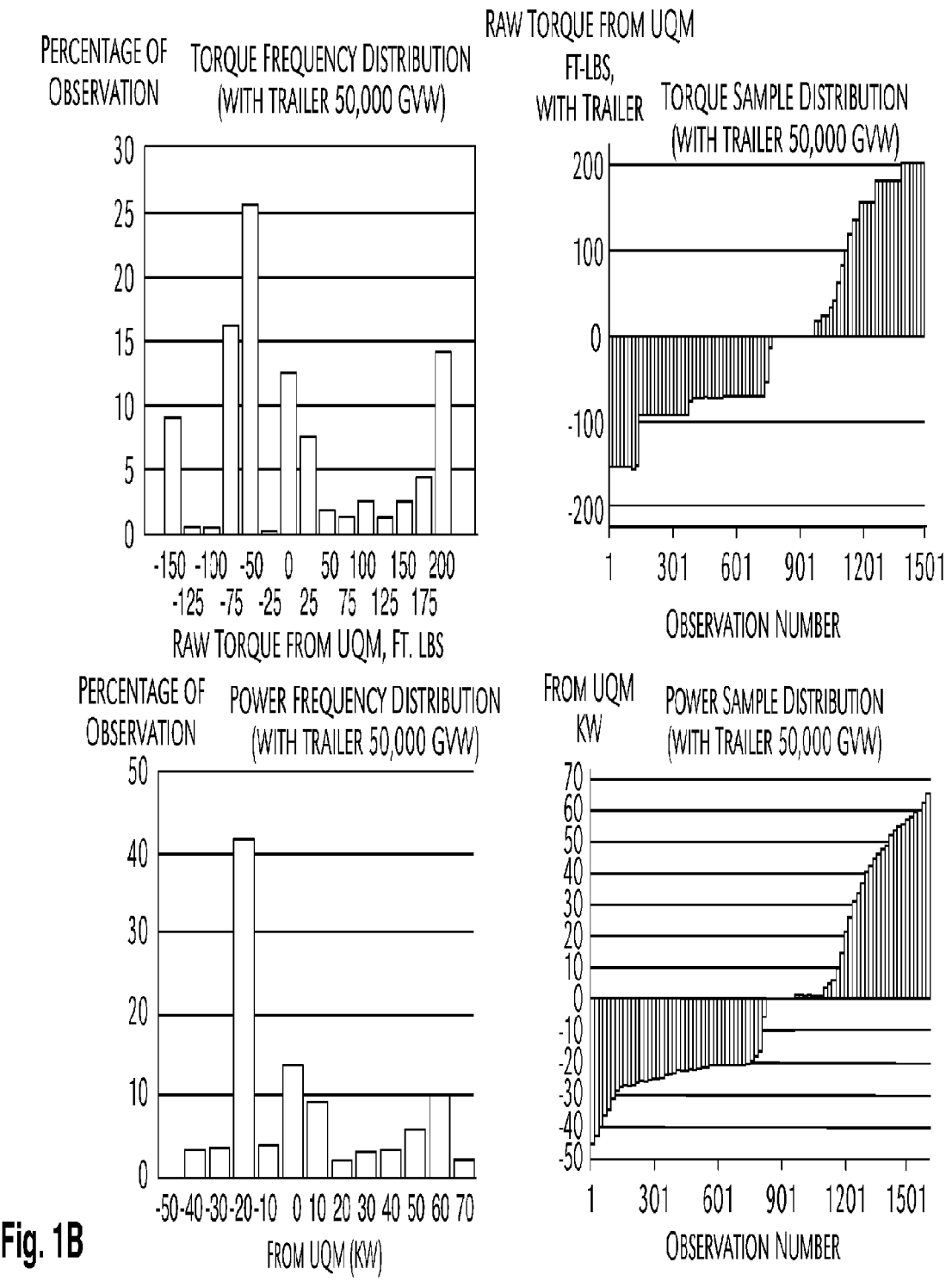

Referring now to FIGS. 1A and 1B, test data for embodiments of the invention is shown. The test data was generated by an ET system-equipped HDV that was driven according to a drive cycle representative of a drive cycle of a day truck (e.g., in the Los Angeles area. FIG. 1A shows test data for a "cab only" test. FIG. 1B shows data for a truck with 50,000 pound gross vehicle weight.

Embodiments of the invention utilize a power exchange unit (PXU) in lieu of a conventional PTO. This PXU contributes to enabling the retrofitting of an ETMG to conventional transmissions on the diverse fleet for the herein described wide-ranging purposes in an arrangement addressing the economically challenged ownership described herein. Design of the PXU is based partly due to discoveries regarding speed and torque needs and limits that are encountered in the drive cycles of existing HD trucks. In addition to contributing to design of the PXU, research into drive cycles of HD day-trucks has also helped enable selection of the retrofit ETMG and battery for the present invention and has helped in the development of specific algorithms and constraints for control logic of the retrofit electric traction system and method. The algorithms govern when to electrically power the truck via ETMG, when to mechanically power the ETMG to recharge the battery and at what charging rates, when to automatically switch between ET and ICE modes, and how to do so.

In accordance with the street operation drive cycle requirements of an HDV, in one embodiment of the invention, the transmission is a heavy duty manual transmission and the truck is propelled by the ETMG in ET mode over substantial distances and a range of street driving speeds, in accordance with conventional street operation drive cycles, such that the driver by necessity shifts the manual transmission to achieve street speeds during the ET mode driving session. This is achieved even though the ETMG may, in one embodiment, be connected to the transmission input via the PXU without the benefit of a clutch, which is unlike the conventional ICE-driven arrangement in which the ICE may be momentarily disengaged from the transmission via the vehicle's conventional ICE/transmission clutch in order to shift gears. In addition, in one aspect of an embodiment of the present invention, problems have been discovered and addressed regarding structures and methods concerning how to shift gears of the heavy duty manual transmission in the ET mode, i.e., without use of the clutch that is ordinarily used for momentarily disengaging the source of HDV propulsion.

As previously mentioned, retrofit systems are known for addressing very specific problems, but not for addressing a wide range of street driving issues. In contrast to the above described arrangement of the present invention, hybrid electric vehicles (HEV's) for today's street driving conditions tend to be originally manufactured for HEV operation, e.g., transmissions specially-designed in original equipment manufacturing (OEM) for power sharing and automatic shifting. Typically, these special automatic transmissions integrally include all necessary gears for both an electric motor and the ICE, and may even include the electric motor itself, i.e., mounted inside the transmission case. OEM HEV's also typically run an electric motor and ICE concurrently a significant part of the time.

As previously mentioned, technology is still further applied not only to address the nature of aging hardware, but also the aforementioned fragile ownership structure, according to an embodiment of the present invention. By contrast, HDV emissions problems have existed for years, with major truck manufacturers continuing to sell ICE-based trucks that reduce emissions to more nearly acceptable levels. This prior solution has not substantially reduced fossil fuel consumption and has resulted in more expensive class 8 HDV's. However, the existing class 8 HDV ownership structure includes approximately 700,000 to 900,000 independent owner/operators. This ownership tier of the trucking industry has survived and grown mainly due to pre-owned HDVs, which are available as a result of the long life of class 8 HDV's. Most independent truckers simply cannot afford to purchase a new emission-compliant HDV, which may cost upwards of $125,000. One estimate for a new, cleaner diesel HDV is $126,000. One estimate for a liquid natural gas driven HDV is $184,000. It should be noted that about one quarter of the existing fleet of more than 3 million class 8 HDV's are model year 1993 or older vehicles. It would cost upwards of $500 billion to replace the current fleet. Thus, these owner/operators could be put out of business if new emission-compliant HDV's are required over the short term without expensive government subsidies. To address this issue, a retrofit ET system is provided according to an embodiment of the invention.

Figure 2:
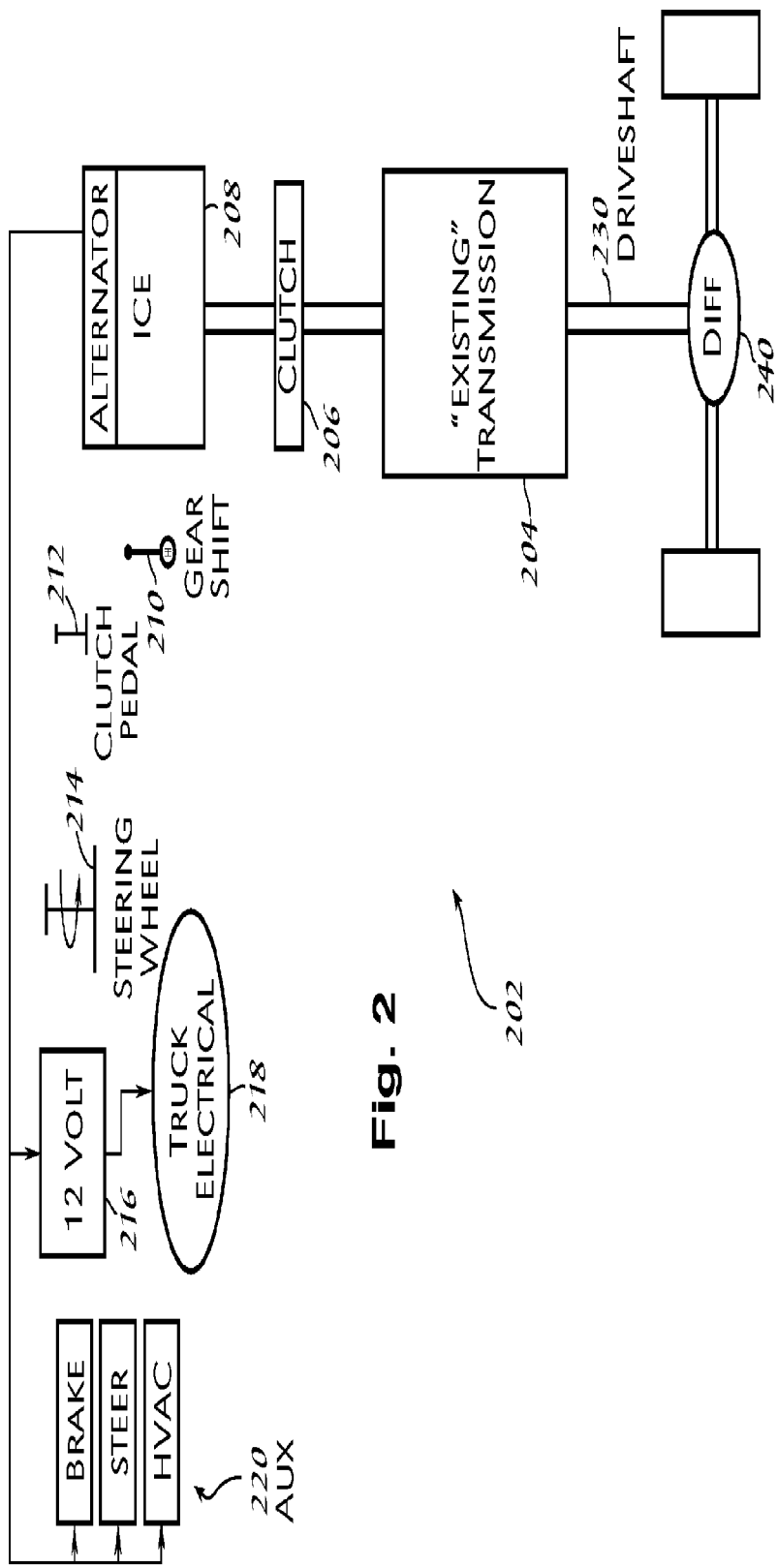
FIG. 2 is a block diagram of system components of a vehicle.

Referring now to FIG. 2, an original equipment manufactured HDV 202 is shown. Vehicle 202 includes a transmission 204 coupled to an ICE 208 by a clutch 206. Gear shift lever 210 is connected (not shown) to the gear box (not shown) of transmission 204. Clutch pedal 212 is operated by a driver to engage and disengage clutch 206. Steering wheel 214, which is for steering vehicle 202, is also shown. The vehicle 202 electrical system 218 is powered by a 12 volt battery 216, which is recharged by an alternator (not shown) powered by ICE 208. Auxiliary systems 220 are also powered by ICE 208.

Figure 3:
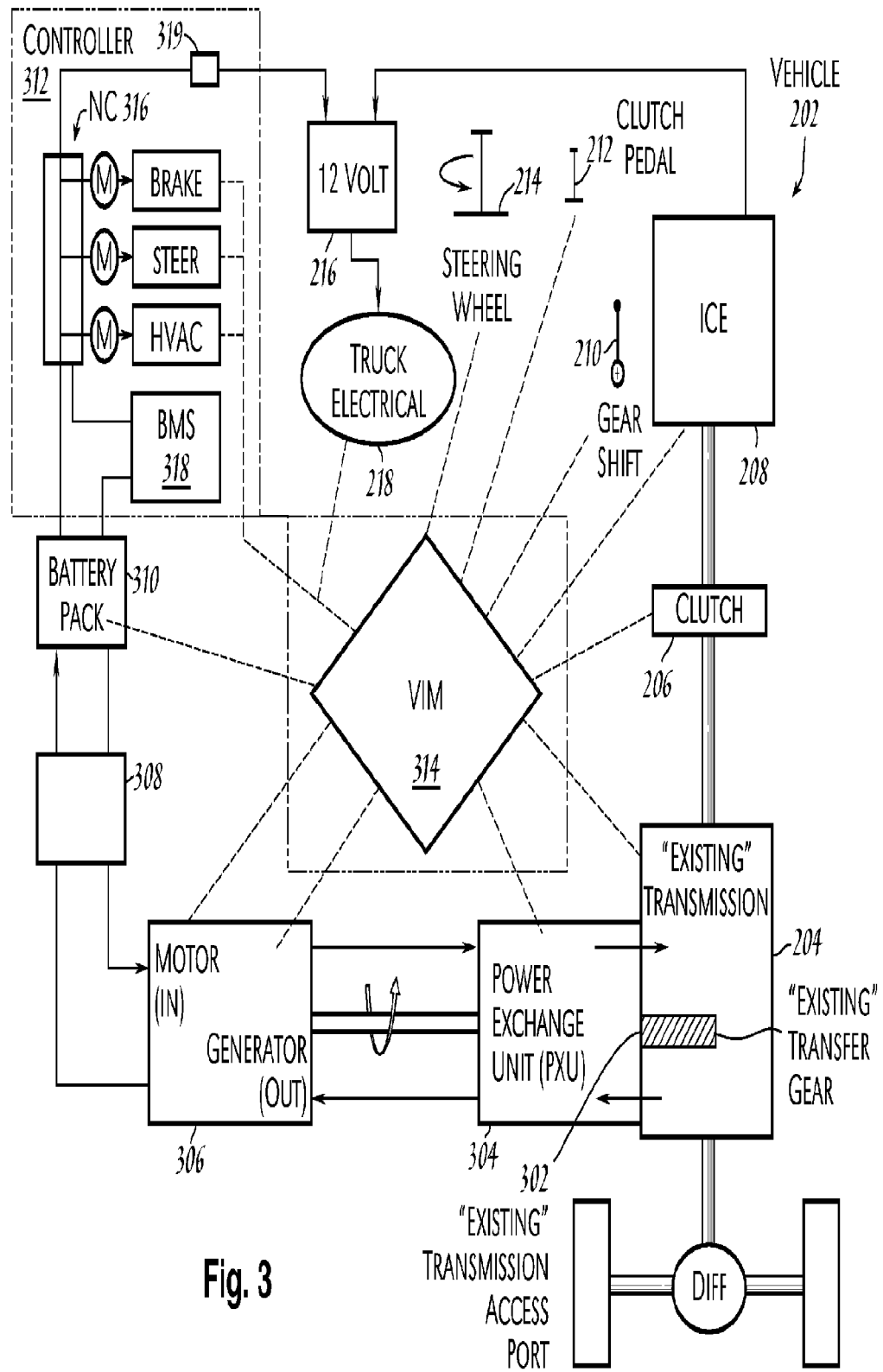
FIG. 3 is a block diagram of system components of disclosed embodiments of the present invention.

Referring now to FIG. 3, a block diagram is shown of the HDV of FIG. 2 retrofitted with an ET system, according to an embodiment of the present invention. Transmission 204, clutch 206, ICE 208, gear shift 210, clutch pedal 212, steering wheel 214, battery 216 and electrical system 218 are as shown in FIG. 2. Power exchange unit ("PXU") 304 is coupled to a transfer gear (not shown in FIG. 3) of transmission 204 via PTO port 302 (also referred to herein as "transmission access port"). ETMG 306 is mechanically coupled to PXU 304 via the shaft of ETMG 306. The electrical connections of ETMG 306 are connected to rectifier/inverter 308, which converts the electrical output of ETMG 306 to charge battery pack 310 when ETMG 306 is driven by PXU 304 to operate as a generator. When ETMG 306 operates as a motor, rectifier/inverter 308 converts the stored electrical energy of battery pack 310 to drive ETMG 306, which mechanically drives PXU 304 to propel vehicle 202 via the transfer gear of transmission 204. Battery pack 310 may be an Altair Nanotechnology 15 KWh 300-400 VDC, in an embodiment of the invention.

ETMG Same Speed Whether in Motor Mode or Generator Mode

According to an embodiment of the present invention, the ET system includes an ETMG coupled to the transmission via a fixed gear ratio PXU (which may be shop-changeable) with no clutch interposed between the ETMG and a gear or gears of the PXU, wherein the ETMG generates and motors over essentially the same speed range. For example, in one embodiment of the invention the ET system includes a UQM model SR218/DD45-400LWB permanent magnet motor-generator and driver-inverter. The UQM motor-generator operates in a range of approximately 0-4000 rpm for both mechanical/electrical and electrical/mechanical power conversion. In another embodiment, an induction motor-generator is provided.

Motor Speed-torque Curve

An embodiment of the present invention involves equipping an ICE-propelled class 8 HDV with a battery, control system, PXU, and ETMG, and injecting, via the electric motor, adequate power through the PTO port at an adequate PXU gear ratio to approximate performance characteristics of the ICE, i.e., driving feel, where the electric motor provides the sole propulsion over a range of speeds suitable for a substantial portion of street driving, where the upper limit of the electric driven speeds depends on the loaded weight of the HDV. In an embodiment of the invention described herein, the speeds for electric-only propulsion include up to about 30 MPH for cab only and up to about 15 or 20 MPH for a fully loaded vehicle. (Speed and electric driving range may be extended by use of a larger electric motor and battery.) The arrangement is configured such that the battery has adequate storage capacity and can withstand adequate recharge rates such that in the generating mode the ETMG can recharge the battery sufficiently during driving sessions to sustain ordinary driving cycle demands of a day truck.

All of the above combined with the number of deep recharge cycles that the battery can withstand cooperate to provide a system that is also capable of retrofitting an existing fleet of class 8 or smaller HDV's in an economically cost effective manner. That is, in some reasonable economic scenarios the retrofit system actually pays for itself within a reasonable period based solely on reduced fuel costs, not even taking into account emissions reduction issues, which may also be assigned some economic value.

Experimentation for the present invention has revealed that it may be desirable for the ETMG of the ET system to have a relatively flat torque curve, such that high torque is available early and is relatively constant throughout the RPM range. This torque characteristic separates traction drive motor systems from other systems employed for fans, pumping and the like. The PXU output speed causes the transmission to operate at typical shaft speeds so that the operator does not have to change customary transmission gear box manual shifting patterns to utilize the ET system. This may constrain what might otherwise be a greater range of choices regarding selection of gear ratios for the PXU. In other words, the PXU output meets the transmission input in a balanced way that mimics the driving feel of the ICE when it inputs torque to the transmission, and it does so within transmission and ETMG and PXU speed and torque limitations, which may include manufacturer specified limitations.

PXU has a large gear ratio, which is shop-changeable, and is rated for both high speed and high torque In embodiments of the invention, it is important to efficiently move power from the ICE through the transmission and into the batteries in ICE mode, and then from the batteries back into transmission in ET mode. As such, an interface to the transmission is provided that has appropriate, shop-changeable gear ratios along with adequate speed and torque handling capability.

Even with a relatively flat speed-torque curve, research for the present invention has shown that for the existing fleet of U.S. HDV's, a mechanism may be still needed to gear the ETMG torque up when operated in one direction for motoring (i.e., in ET mode), while gearing the ETMG speed up when operating in the other direction for generating (i.e., in ICE mode), according to an embodiment of the invention. Experimentation in the present invention has shown that off-the-shelf PTO's can be found for gearing the ETMG torque up for motoring and gearing the speed up for generating, but off-the-shelf PTO's have not been found to provide a sufficiently large gear ratio to accomplish the desired speed and torque ratios. Further, off-the-shelf PTO's have not been found to provide a suitable combination of maximum torque and maximum speed rating. Such off-the-shelf PTO's that are rated for higher RPM limits are not designed to handle the needed torque limits of the present invention, while those that are suitable for the required maximum torque input in ET mode tend to be geared too low to provide the needed output RPM in ICE mode. Experimentation and analysis for the present invention indicates that the speed ratio between the ETMG shaft and the shaft of the transfer gear on the input of the transmission, i.e., the gear accessible via the PTO port, is workable if in range of 2.0:1 to 2.5:1. In an embodiment of the present invention, the PXU has a fixed gear ratio within this range and has a maximum torque limit of at least 500 ft-lbs and a maximum speed limit of at least 5000 RPM to accommodate most of the existing fleet of US class 8 HDV's. In another embodiment of the invention, the PXU has a maximum torque limit of at least 550 ft-lbs and a maximum speed limit of at least 4500 RPM for the same purpose. It should be noted that a limited number of transmissions in the U.S. fleet of class 8 HDV's may require a torque of 735 ft-lbs and have a 4500 RPM capability.

The PXU has a port for coupling to the transmission access port and a port for coupling to the ETMG. In another embodiment of the invention, the PXU is capable of receiving the maximum torque at a speed of ½ the maximum speed in one port and delivering the maximum speed at a torque of ½ the maximum torque out the other port, as well as vice versa.

As an experiment, a belt system was built to adjust an off-the-shelf PTO to the needed gear ratio and the system was tested. Such an arrangement works well for the purpose of delivering mechanical power from the ETMG to the transmission and vice-versa, but it is heavy and operates at lower efficiency than a geared device which performs the same functions. The lower efficiency is multiplied throughout every energy transfer in the system, hurting overall performance and efficiency.

Figure 4:
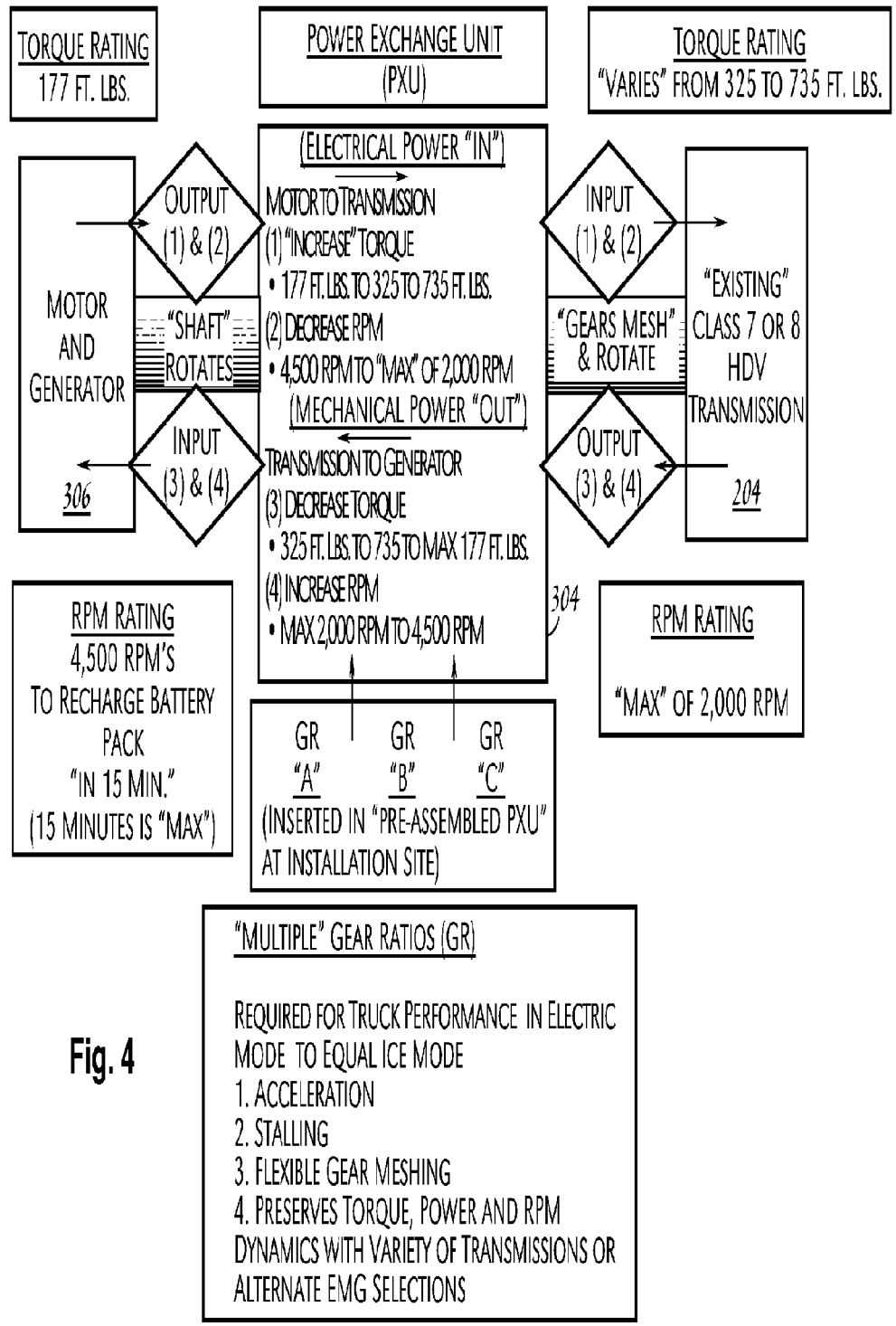
FIG. 4 is a block diagram of system components of disclosed embodiments.

Referring now to FIG. 4, details of a PXU 304 are shown in accordance with an embodiment of the present invention as it relates to ETMG 306 and transmission 204, which is connected to the ICE. Mechanical energy transferred from through the power exchange unit 304 (PXU) from the HDV transmission 204 is converted to electrical energy for storage in the ET battery pack (310 in FIG. 3) for use in the same or later driving cycles. Energy from the battery pack 310 is returned from an electrical potential state to a mechanical kinetic state through the motor 306 shaft, which is connected to PXU 304. In the present embodiment, a relatively small motor of light weight, low volume, and low cost is selected which is capable of generating between 177 ft-lbs of torque over a range of 0-4500 RPM and with a relatively consistent output of torque over the RPM range.

Stored electrical power now transferred as mechanical rotational energy passes through PXU 304, which in this embodiment is designed to allow the interchange of gears such that a max torque of 177 ft-lbs is converted to a maximum of from 325 of torque while minimizing the maximum input RPM of 4500 RPM to a maximum of 2,000 RPM in compliance with transmission manufacturer specifications. The interchangeable gear feature S-02-A allows transition to higher torques such as 550 or 735 ft-lbs of torque with only a slight variation of ETMG max torque output specifications while still maintaining the maximum output of 2000 RPM.

Rotational energy from PXU 304 is transferred to the HDV transmission 204 through PXU 304 interface gears and into the transmission 204 spur gear according to the output limitations described above to propel the vehicle in a defined speed range with performance characteristics similar to that of conventional diesel engine operation.

During both the ET mode and the ICE mode during selected conditions, the ETMG 306 applies a REGEN load to the PXU 304 thereby causing mechanical energy either from the ICE or from the momentum of the moving HDV to be conveyed from the HDV transmission 204 to be conveyed back through the PXU 304 and into the ETMG 306 shaft. In this embodiment, power from the transmission at up to 325 ft-lbs and with a 2000 RPM maximum is converted to power with a maximum torque of 177 ft-lbs and up to 4,500 RPM maximum. Such a torque rating and RPM range is suitable for power generation in the present embodiment, and based on known drive cycles is capable of fully charging the ET batteries in a period of 15 minutes of less.

Mounting Bracket

A PTO may be simply bolted directly to a transmission PTO port. However, since the PXU in the present system encounters and is rated for higher torque than a conventional PTO, a conventional mounting arrangement may not be suitable. The PXU also generates torque going into the transmission in generator mode, and out of the transmission in motoring mode. Accordingly, in an embodiment of the present invention, the purpose-built PXU has integrated brackets that bolt to the transmission housing as shown in FIGS. 5A-5D in additional locations. This distributes forces over a greater area of the transmission housing. A separate drive train and u-bolt coupling allow for flex and vibration correction, as well as alignment correction.

Now referring to FIG. 5A, a side view of PXU brace shows details as relating to this embodiment of the PXU and its relationship to the OEM transmission. FIG. 5A is for a typical ICE 208 to transmission 204 arrangement, where a clutch 206 is normally located between ICE 208 and transmission 208, and where a drive shaft 230 typically travels from the rear of transmission 204 to a rear differential 240.

In this embodiment, bolted to the lower portion of transmission 204 is PXU 304 attached to the heavy duty transmission access port 302. Because of the high torque application described herein, the present embodiment includes a "broken-U" shaped brace 502 (also referred to as a "bracket"). In this embodiment, each side of the brace 502 bolts to the transmission access port 302 and attached PXU 304 with slightly lengthened mounting bolts 504. Similarly the top end of said bracket 502 bolts to the transmission 204 with slightly lengthened oil reservoir bolts 506.

Such an arrangement allows the PXU brace 502 to carry a portion of the stress to the transmission 204 housing 520 that would normally be carried by the transmission oil reservoir 510, thus lowering stress on the transmission oil reservoir 510 and preventing stress fracture due to metal fatigue.

FIG. 5B shows a view from the rear of the PXU brace 502 as it would be oriented in typical installation. FIG. 5C shows a side view of the bracket 502 only.

Figure 5D:
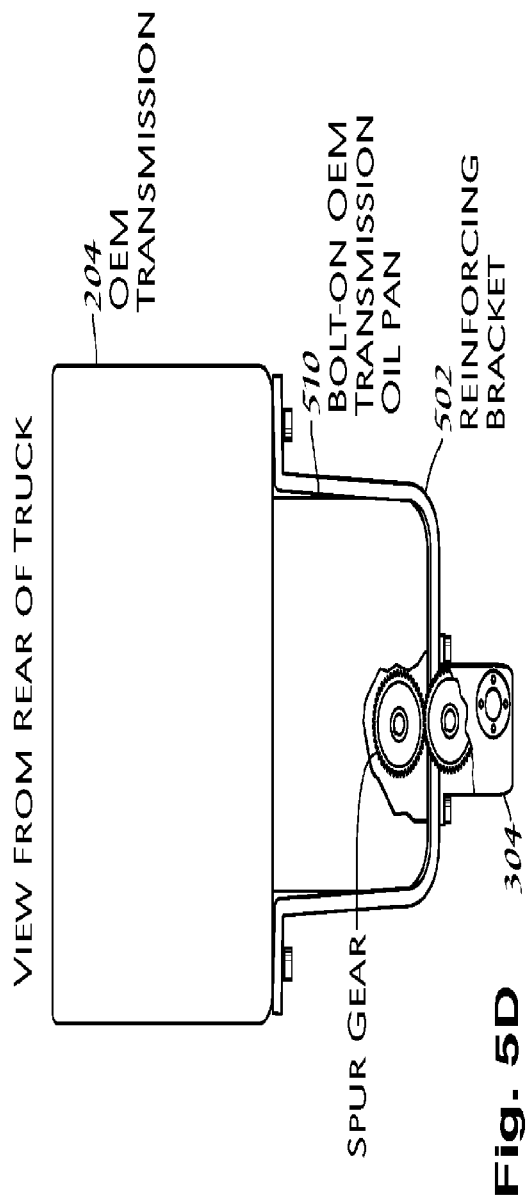

FIG. 5D shows a cut away rear view of the PXU brace 502 as it relates to transmission 204, transmission oil reservoir 510, and PXU 304.

Controller

Returning now to FIG. 3, the electric traction related system of embodiments of the present invention (including, for example, a retrofit system that is added to an existing vehicle 202, in an aspect of an embodiment of the present invention, includes a programmable vehicle integration module (VIM) 314 coupled to a motor controller 316 (collectively referred to herein as the "controller" 312 or the "ET controller" or the "ET system controller" and is distinguished from an OEM ICE and auxiliary system controller.) The ET controller 312 is tied to the OEM ICE CANN bus system to retrieve information about status of the vehicle.

The motor controller 316 portion of the ET controller 312 has independent inverters and controllers for ETMG and each auxiliary system motor, e.g., prime mover ETMG 306, air compressor motor for power brake, hydraulic pump motor for power steering, and A/C compressor motor. The inverters receive power from the propulsion battery 310 at 300-400 VDC and output pulse width modulated, 3 phase, 230 VAC to the driven motors. Each inverter is capable of controlling motor speed. In addition, the controller has a 12V board component 319 (also referred to herein as "power supply") that is used to supply the conventional 12V power system for vehicle 202, and to keep the conventional 12V batteries 216 charged. The integration module portion 314 of controller 312 controls all of the electric traction related system functions, operating each function only as needed and at the output needed at any given time.

The system has automatic switching capability, according to which controller 312 causes vehicle 202 to switch from ICE mode to ET mode according to predetermined logic, which is responsive to inputs, some of which may be read from the ICANN bus. In an embodiment of the invention, the inputs include battery state of charge ("SOC"), engine speed, accelerator pedal position, loaded weight of vehicle, geographical position data, gear shift button state, mode select button or switch states, steering position sensor, ignition key states, clutch actuator limit switch states, air conditioning inputs, including compressor demand signal, and brake air pressure. Outputs include motor torque request, ICE accelerator position, clutch actuator enable and direction, key disable relay, start enable relay, power steering control, A/C control, cooling control, alarm control, user interface/gauge drivers, ICE off rpm indicator (for shift timing), and brake air pressure compressor control.

Clutch Actuator

The controller may engage and disengage the ICE clutch 206 using a 12 V worm drive feed. When the clutch is engaged, the user can still manually disengage it. Once actuation starts in one direction, it continues until the target limit switch is activated. Inputs: Traction mode from software, input limit switches at both ends of travel (2 digital sensors). Outputs: 12V relay to control direction, 12V relay for ON/OFF.

Accelerator Pedal

Operation: Disconnect accelerator pedal from OEM ICE ECU. HEV ECU measures pedal sensor position and transmits appropriate signal to ICE ECU and traction motor controller. Inputs to controller: Accelerator pedal sensor PWM signal. Outputs from controller: PWM signal to ICE ECU, CAN message to traction motor control.

Start Button

Operation: Relay placed in parallel with the START button. Relay can actuate START independently of operator command via START button. Allows turn on of ICE without pressing button. Inputs to controller: J1708 engine speed. Outputs: Relay to actuate start signal.

Ignition Key

Operation: Relay (NC) placed in series with ignition key. Relay can turn off vehicle independently of ignition key. Key input to HEV controller is sensed ahead of relay. Allows turn off of ICE while key is on. Ignition key OFF disables both ET and ICE modes. Relay OPEN disables/shuts off ICE. Inputs to controller: ET/ICE mode software. Outputs: Relay signal.

Gear Shift Button

Operation: press button when shifting gears. Limits torque on electric motor. Allows user to control speed to shift gears when in ET mode. Disables regen, allowing ICE to shift gears as normal. Inputs to controller: button on shift lever. Outputs: CAN message to traction motor control, pedal position output to ICE ECU.

ET/ICE Mode Change Notifier/Alarm

Operation: Alarm is sounded before turning ICE ON or OFF. Inputs to controller: ET/ICE mode software. Outputs: Signal to alarm that sounds periodically (~2 Hz)

It should be understood that the control circuits and controllers described herein may be one or more programmable devices having a memory and a processor, wherein the logical processes described are determined by program instructions stored in the memory, i.e., the processes are implemented by the processor reading the instructions from memory and executing them.

In switching from the ICE mode to the ET mode, the controller sends a signal causing an actuator to engage the truck's conventional clutch (i.e., between the ICE and transmission) over a time interval of a few seconds. The time interval allows matching the transmission speed with the motor speed to avoid clashing gears. The controller then energizes or de-energizes a relay that shuts off the ICE. The automatic engagement and disengagement of the clutch is only necessary when the changeover between ET and ICE or ICE and ET is accomplished. Once in ET mode, the clutch is not used. In ICE mode, the clutch is used in a conventional fashion.

Driving in ET Mode

The driver may control the ETMG via the accelerator pedal, since a position sensor has been added as part of the previously mentioned retrofit, wherein the position sensor is configured for sending a signal to the controller. The signal is in some way proportional to the position of the accelerator pedal. In one embodiment, the signal magnitude is proportional to the position. In one embodiment, the signal contains digital information that indicates various positions. In another embodiment, the controller reads the existing pedal sensor which follows SAE J1843. Drive by wire to the ICE is also accomplished by outputting an SAE J1843 signal to the ICE electronic control module (ECM or ICE ECM)

If the driver releases the pedal beyond a certain point that is predetermined as a zero torque request output position, the controller causes the ETMG to begin generating responsive to the position of the pedal below the zero torque position. This is a form of regenerative braking, i.e., providing deceleration and power generation in some way proportional to the pedal position. In this way, the ET mode works much as the ICE would—either accelerating the vehicle or "jake braking" the vehicle according to driver input.

In connection with shifting gears the driver presses a button on the gear shifter. In ET mode this button causes a change in the way the controller responds to the accelerator pedal in controlling the ETMG, so that shifting in the ET mode feels more like shifting an ICE. More specifically, in response to the button the controller attenuates its response to the accelerator pedal position so that the driver can have more fine control over the ETMG speed via the pedal, whether the ETMG is propelling the vehicle as a motor or regenerating power as a generator. Thus, the ETMG will slow down more like an ICE slows down when the operator lets up some on the pedal. And the ETMG is also easier for the operator to rev up to an appropriate speed when down shifting. By taking these actions, the operator will put the ETMG into approximately the right rpm range for the next gear and can shift gears much like shifting the ICE. (HDV drivers do not tend to use the clutch for shifting gears for the ICE after starting up in first gear.)

Switching to ICE Mode

The truck then proceeds under ET power until such time as the controller detects a predetermined condition designated for switching back to ICE mode. One such condition is where the controller-detected vehicle speed exceeds a predetermined speed that has been programmed into the controller's memory. This predetermined speed is approximately 15 mph loaded and 30 mph cab only in an embodiment of the invention, lower if the battery SOC is low. Testing in the present invention has determined that electric power is less fuel efficient than ICE power in many cases above this speed, at least according to the electric traction arrangement disclosed herein. Since the ET system is translating energy from one form to another, it may be more efficient to use the energy directly than to generate and store it for future use. The ET system relies on the efficiency of the battery and ETMG to compensate for the inefficiency of the diesel, especially at idle and low torques or low speeds.

In a hybrid vehicle, ultimately all the energy for ET mode comes from the ICE. Overall there are efficiency losses at every step, setting aside energy that may be acquired before initial operation from the electric grid. There are also inefficiencies in running the ICE (so-called idling losses, i.e., relatively fixed losses). Applicants have found through analysis and testing that at idle and low torques or low speeds, the inefficiencies in running the ET system are less than the idling losses for the ICE, so the ET mode provides a net savings in energy consumption by operating at idle and low torques or speeds.

Another condition for which the controller switches back to ICE mode is where the controller detects that the ET batteries have reached a preset low state of charge Another condition for which the controller switches back to ICE mode is where controller-detected ETMG current exceeds a predetermined limit that has been programmed into the controller's memory, which is due to the driver demanding torque output (via the accelerator pedal) that cannot be continuously provided by the ETMG (which is motoring in ET mode, of course). (It should be understood that motor current may be measured in lieu of motor torque in the various control contexts described herein.)

Just before the controller causes the vehicle to switch to ICE power, the controller sends a signal energizing an audible device in the cab to notify the driver of the switch. In switching from the ET mode to the ICE mode, the controller first starts the ICE, which may rotate freely since it is disengaged from the transmission by the clutch, which is held in the disengaged position by the ET system clutch actuator. Next, a 'drive by wire' interface (J1843 in the present embodiment) takes control of the throttle and revs the ICE to an RPM closely matching the RPM of the clutch flywheel that is fixed to the transmission input. More specifically, a pilot device of the present ET system is coupled to the vehicle's conventional throttle linkage (e.g., throttle cable, the accelerator pedal, etc.) and receives a control signal that is output by the controller. The controller receives a signal from a speed sensor over the vehicle communication bus (J1708 or J1939) that monitors the ICE rotation and is programmed with information that correlates the measured ICE RPM to the RPM of the transmission clutch flywheel. (Note that depending on where the ICE RPM is measured, the transmission clutch flywheel RPM and the ICE RPM may correspond 1:1.) The controller adjusts the throttle linkage output signal to adjust ETMG rotation to match the ICE rotation to that of the transmission input. The controller processes the input from the accelerator pedal and sends whatever values are appropriate to the ETMG controller and the ICE ECM.

Once this is done, the controller sends a signal to the clutch actuator to cause the actuator to slowly allow the clutch to engage. "Slowly" in this context refers to 0.5 to 10 seconds, in one embodiment of the invention. Next, the controller smoothly over is releases control of the throttle to the driver, and continues to detect driving conditions.

In the ICE mode, the system evaluates driving conditions and selects recharge rates for the ETMG responsive to predetermined conditions where the ICE is able to operate efficiently or where additional load will cause the ICE to operate more efficiently. Under these conditions, depending on battery state of charge, the controller may increase regen torque command to the ETMG, causing the ETMG to load the PXU for the purpose of increasing electrical current generation, i.e., increase battery charge rate.

Selecting the generation/charge rate responsive to state of the ET battery charge includes, in one embodiment, selecting a higher charge rate responsive to a lower battery charge state.

For example, the charge rate selected may be proportional to the battery discharge state. Selecting the generation/charge rate responsive to whether additional load will cause the ICE to operate more efficiently includes, in one embodiment, selecting a higher charge rate responsive to a lower ICE torque, since diesel ICE's tend to be more efficient at higher torque.

ICE percent engine load is transmitted along the vehicle bus (SAE J1708 or J1939) In an embodiment of the invention, regen current is a function of battery SOC, In one embodiment, different torques are commanded in different SOC bands. Regen current may be a function of engine load percent (as described above). Regen current may be a function of engine RPM. The engine is more marginally efficient and has higher available torques in the upper middle of its RPM range. Marginally efficient means the additional output power compared to the additional input fuel.

The controller also uses vehicle speed as one determinant of rate of generation and as a consideration for how much to charge the batteries. In instances where the truck is moving at a higher speed, the controller may choose not to use ICE power to charge the batteries completely. Instead, in anticipation of vehicle deceleration the controller may choose to leave some "room" in the batteries, i.e., to charge the battery to some state below fully charged, thus taking advantage of the likelihood of capturing power for battery storage via regenerative braking when the vehicle must be slowed. In one embodiment of the invention, the controller selects the level of charge below fully charged as a function of the speed of the vehicle above a predetermined speed. In one embodiment, the function is a proportional function.

In one embodiment of the invention, the controller receives a location signal from the GPS system of the supervisory subsystem and selects rate of battery charge responsive to comparing the detected vehicle location to a predetermined location or locations that have been programmed into a memory of the controller. This is because in some geographic regions there are known locations for staging areas in which ICE idling is not permitted or is severely limited (for example, the Port of Los Angeles), so that ET mode of operation is demanded in those areas for longer intervals. More specifically, in one embodiment, the controller i) determines the distance from its current location to such a predetermined, ET-demanding staging area; ii) computes a heading based on a succession of location signals from the GPS, or else simply receives a heading that the GPS has computed; iii) computes travel time to a predetermined, ET-demanding staging area based on current heading; iv) determines a required rate of charge that is needed to fully charge the battery during the computed travel time for the given battery charge state; and v) begins charging the battery at the required charge rate determined in iv).

The ET system is capable of having multiple modes of operation, including modes for "Cab only" situations and "loaded" situations. During periods of operation with no trailer ("cab only"), or with an unloaded trailer, the ET system can perform efficiently during acceleration up to higher speeds than during times when a heavy load is pulled. Because research has determined that 40% of common day truck drive cycle time is under conditions of low or no load, it is desirable to utilize the ET mode in a range of higher operating speeds. In various embodiments of the invention, the controller selects speeds for switching between ICE and ET modes of operation responsive to a manual input signal or else automatically, such by monitoring a strain gauge connected to the trailer receiver ($5^{th}$ wheel). The system can also be configured to have more sophisticated modes of operation where switching points may be adjusted to maximize efficiency for any specific load. In one embodiment, this is done using data analysis, where the truck measures time from speed X to speed Y in a specific gear and at the measured power output. Using a formula, the control calculates the load of the vehicle and adjust ET/ICE switching set points accordingly, e.g., speeds, torques, SOC, etc.

Other modes of operation may also be facilitated through the controller. Special modes of operation such as a "port mode" may be activated either manually or automatically responsive to the controller monitoring GPS provided location information. In special modes, more limited performance characteristics may be enforced or starting of the ICE may be overridden except in certain extreme situations such as, very low levels of battery charge. The ET system may be disabled in case of failure.

Figure 6:
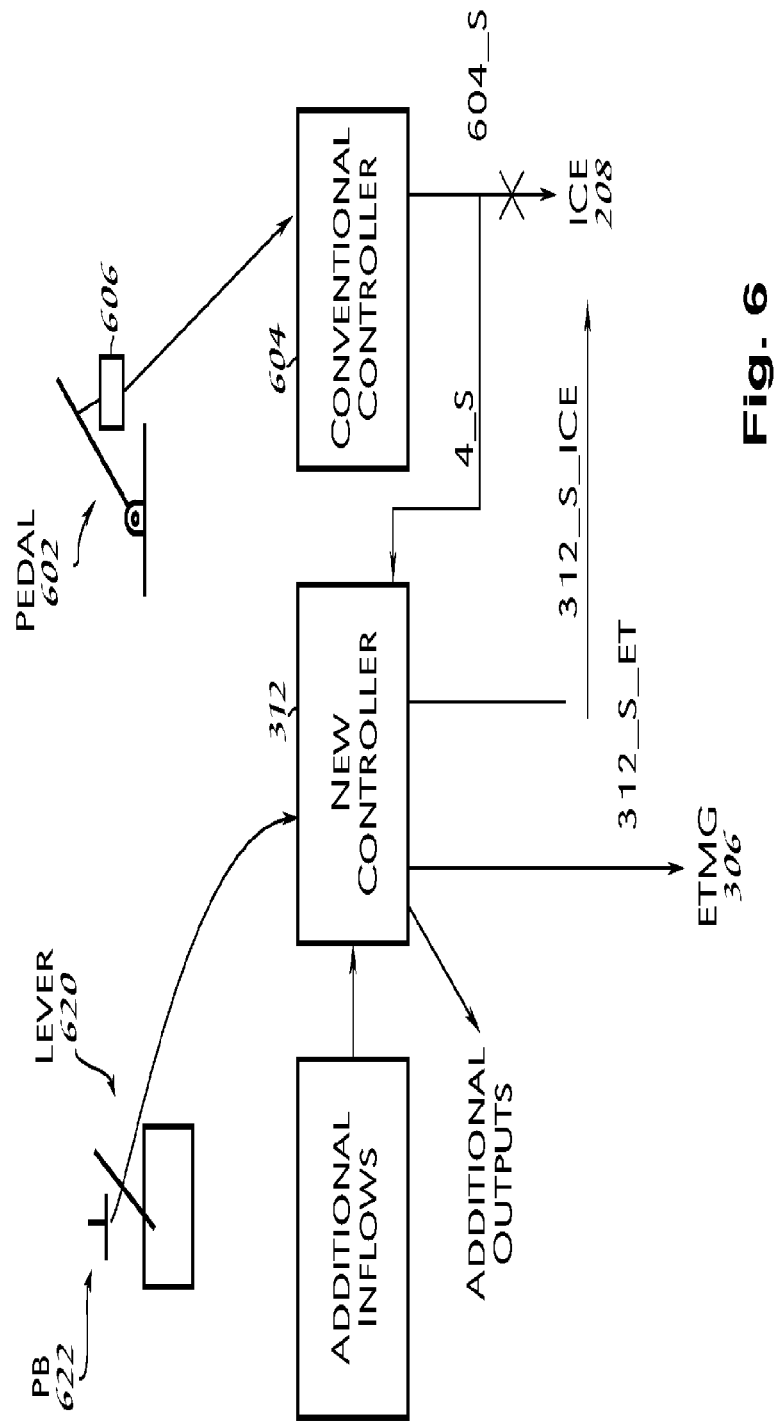
FIG. 6 is a block diagram of system components of disclosed embodiments.

Referring now to FIG. 6, the conventional vehicle has an accelerator pedal 602 by which a driver conventionally regulates ICE speed via a signal 604_S generated by conventional ICE controller 604 responsive to an electrical signal from a sensor 606 connected to pedal 602 for sensing pedal position (or via some mechanical linkage to the ICE, which is not shown). According to an embodiment of the present invention, the original accelerator pedal sensor 606 is connected to controller 312, either in addition to conventional ICE controller 604 or in lieu thereof. If original sensor 606 is connected to controller 312 in lieu of the conventional ICE controller 604, then controller 312 sends the signal from pedal sensor 606 to conventional controller 604, at least selectively. Alternatively, another sensor (not shown) is added to accelerator pedal 602, in which case the new sensor communicates with controller 312 of the present invention.

Controller 312 receives the conventional ICE speed-torque regulation signal 604_S from controller 604 and preempts it with its own signal 312_S_ICE to the ICE, which controller 312 generates at least partly in response to conventional signal 604_S, at least at some times. Controller 312 also generates a similar signal 312_S_ET, which is communicated to a drive that controls the ETMG in order to regulate the speed and torque the ETMG delivers in a motoring mode and to regulate the electrical generation it delivers in a generating mode. (Note that herein reference may be made to communicating the 312_S_ET signal to the ETMG. This is to simplify the explanation of overall operation. It should be understood that the signal is actually communicated to the ETMG's drive.)

Controller 312 has control configurations, referred to herein as "pedal response modes," that controller 312 automatically selects and switches among responsive to operating conditions, as described elsewhere herein. At any given time, controller 312 generates signals 312_S_ET and 312_S_ICE at least partly responsive to the pedal response mode that is in effect at that time.

According to an embodiment of the present invention, controller 312 interprets the position of accelerator pedal 602 such that from 0% to about 33% depressed, the pedal position in this range is deemed by controller 312 to be within a REGEN range. In the next 7.5%, i.e., from about slightly above 33% to about 40.5% depressed, the pedal position in this range is deemed by controller 312 to be within a DEADBAND range. From about 40.5% to 100% depressed, the pedal position in this range is deemed by controller 312 to be within an ACCEL range.

Controller 312 also receives a signal from a push button 620 that has been added to gear shift lever 622 of the vehicle's ICE manual transmission gear box, according to an embodiment of the present invention. The driver may signal to controller 312 when he/she is about to shift gears using button 622. Controller 312 responds to the signal from button 622 by changing its pedal response mode, as will be described elsewhere herein, in order to cause the shifting performance of the vehicle to behave in a more nearly conventional manner, despite the addition of the ETMG and controls their corresponding effects on the vehicle. That is the ETMG, may be generating when the vehicle is operating in ICE mode or may be the sole source of vehicle propulsion (as a motor) when the vehicle is operating in ET mode. But regardless of what operating mode the vehicle is in, controller 312 takes actions responsive to the driver's signal from button 622 to cause the shifting performance of the vehicle to behave in a more nearly conventional ICE manner, which in a preferred embodiment is a heavy duty, e.g., class 7 or 8, diesel truck.

Figure 7:
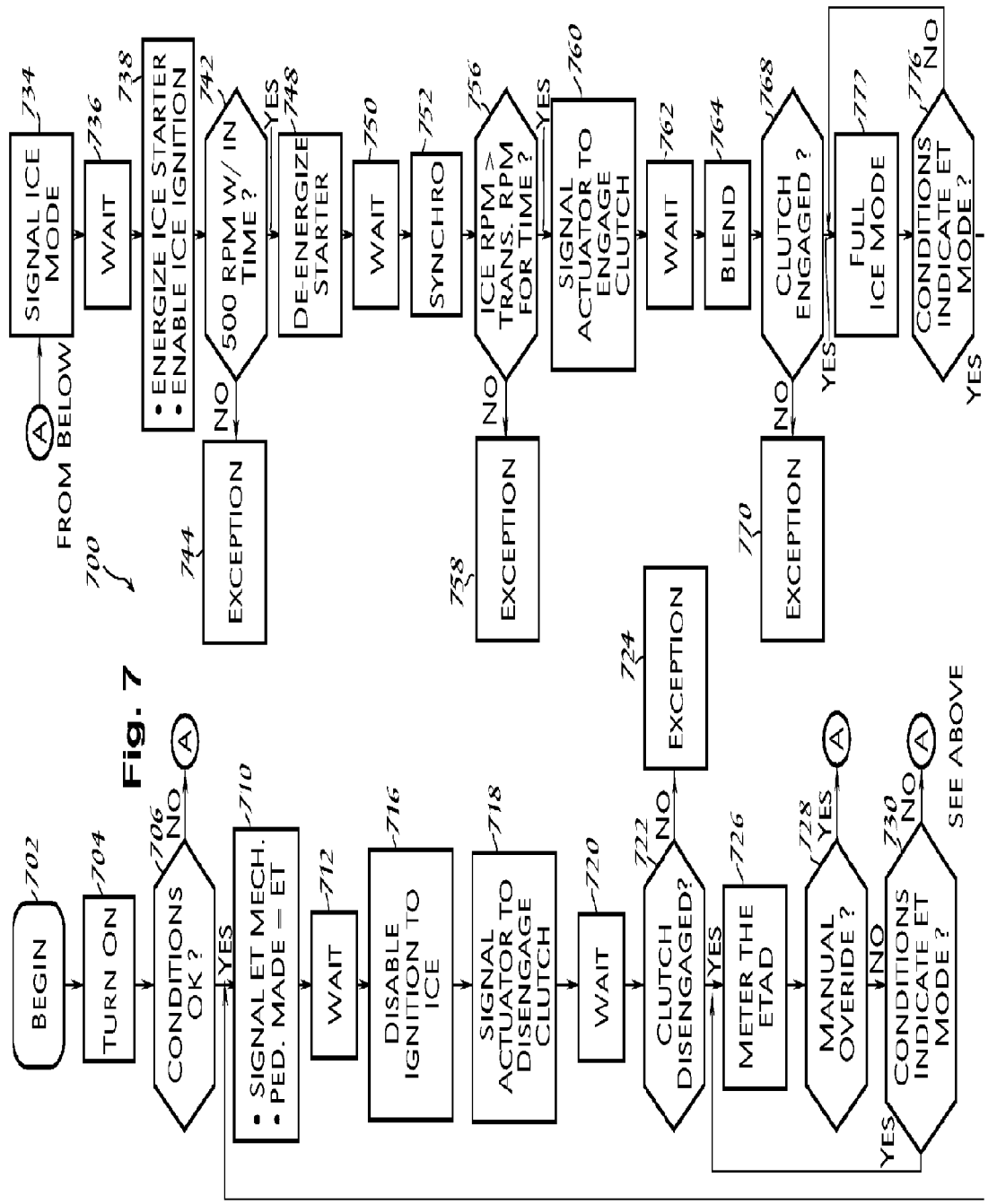
FIG. 7 is a flow diagram of method steps used in disclosed embodiments.

Referring now to FIG. 7, an algorithm 700 is shown for control of electric traction and ICE operation of the vehicle, according to an embodiment of the invention. Beginning at 702, algorithm 700 is initiated. This may include a driver or administrator initializing controller 312 (FIG. 6) to reflect operating conditions for a given driving session. For example, the vehicle may be operating with a fully loaded trailer, e.g., 80,000 gross vehicle weight in pounds, in one driving session. In another driving session, the vehicle may be operating with only the cab, i.e., no trailer connected. In other driving sessions, the vehicle may be operating with a trailer, but not fully loaded. Initialization at 702 may include communicating an operating condition such as this to controller 312, such as by making a selection on a menu that controller 312 displays or otherwise presents to the driver or administrator.

Next, the driver manually turns on the ignition key at 704. Responsive to this, controller 312 (FIG. 6) reads actual battery state of charge and compares it to a predetermined state of charge at 706. Controller 312 also reads the vehicle speed and the torque being delivered to the drive train by the ICE.

If controller 312 determines at 706 that the speed, torque and battery state of charge are within limits, then at 710 controller 312 initiates a signal, which may cause an device in the ICE cab to make a distinctive sound, for example, to alert the driver that the vehicle is about to enter electric traction mode, and also selects the ET pedal mode state, such that controller 312 then begins responding to the accelerator pedal position communicated to controller 312 by sensor ZZZ according to a control configuration described elsewhere herein for ET pedal mode state.

Next, controller 312 waits a predetermined time interval, e.g., one second, at 712, disables the ignition signal to the ICE at 716, and signals the ICE clutch actuator at 718 to disengage the ICE clutch. Then, at 720, controller 312 waits a predetermined time interval, e.g., 2.2 seconds, and then at 722 reads the clutch position to see whether it is now disengaged. If not, controller 312 branches to an exception state at 724. (In one embodiment of the invention, controller 312 branches to 734 for ICE operation for exception state 724.) If yes, then controller 312 energizes ETMG in electric traction motoring mode at 726. That is, in this state the vehicle is being propelled by ETMG power supplied from the vehicle propulsion, i.e., "traction," battery.

At 728, controller 312 checks the state of a manual override switch to determine if the driver is manually directing controller 312 to switch to ICE mode. If yes, controller 312 branches to 734 for ICE operation. It should be understood that although the manual override is shown here at 728, in an embodiment of the invention this checking and branching at 728 could occur at any time during ET mode of operation. In another embodiment of the invention the manual override feature of block 728 is not accessible to the operator, or else is not included at all. In one embodiment, this feature can only be enabled in certain geographic zones such as in a port, and is enabled responsive to a GPS signal input to controller 312.

Next, at 730, controller 312 reads the speed of the vehicle, torque being delivered to the vehicle by the ETMG (operating as a motor) and battery state of charge. If they are within predetermined limits the controller 312 continues motoring the ETMG at 726, checking for manual override at 728, and checking speed, torque and state of charge at 730. (During ET operation, controller 312 and its controlled devices respond to signals arising from gear shifting of the manual transmission, including signals arising from actions the driver takes leading up to the shifting of the gears, as described elsewhere herein.)

In one embodiment of the invention, the predetermined limits include vehicle speed below 18 MPH, torque below 150 ft. lbs., and state of charge above 40% charged for fully loaded vehicle; and vehicle speed below 40 MPH, torque below 150 ft. lbs., and state of charge above 30% charged, for cab only.

In one embodiment of the invention, the predetermined limits include GPS or driver input indication that vehicle is headed to zone where no ICE operation will be allowed, need high state of charge.

Once the speed, torque or state of charge indicates ICE mode is demanded at 730 (or manual override indicates ICE mode at 728) controller 312 branches to ICE operation, beginning at 734, which includes initiating a signal, which may cause a device in the ICE cab to make a distinctive sound, for example, to alert the driver that the vehicle is about to enter ICE mode. After waiting a predetermined time interval, e.g., 1 second, at 736, controller 312 then enables the ICE ignition and energizes the ICE starter at 738. Then controller 312 reads the actual ICE rotational speed (RPM) at 742 and compares it to a predetermined speed within a predetermined time interval, such that the controller determines at 742 whether the ICE actual speed indicates the ICE is successfully starting, i.e., actual ICE speed exceeds the predetermined speed, e.g., 500 RPM, within the predetermined time, e.g., one second. If not, controller 312 branches to exception state 744. If yes, controller 312 then de-energizes the ICE starter at 48 and then waits a predetermined time interval, e.g., 0.5 second, at 750.

According to an embodiment of the present invention, controller 312 next at 752 selects a SYNCHRO pedal mode state, in which controller 312 temporarily overrides the conventional control signal to the ICE that arises responsive to the conventional accelerator pedal sensor (or overrides linkage from the accelerator pedal to the ICE) and preemptively revs the ICE to a predetermined speed (RPM), e.g., 1200 RPM, to help synchronize the ICE speed with the transmission's input speed.

Next, at 756, controller 312 reads actual ICE rotational speed (RPM) and reads or calculates actual transmission input speed, compares them over a predetermined time interval, such that the controller determines at 756 whether the actual ICE speed has exceeded the transmission speed for at least the predetermined time interval, e.g., 0.2 seconds. If not, then controller 312 branches to an exception at 758. If yes, then controller 312 branches to signal the ICE clutch actuator to engage the clutch at 760. Next, controller 312 waits a predetermined time interval, e.g., 0.5 seconds, at 762, and then, at 764, temporarily begins responding to the accelerator pedal position according to a control configuration described elsewhere herein for a BLEND pedal mode state.

JController 312 also reads the actual clutch position at 768 and determines whether the ICE clutch is engaged yet. If no, then after some predetermined time, controller 312 branches to an exception state at 770. If yes, then in this state the vehicle is being propelled by the ICE. Further, upon determining at 768 that the clutch is now engaged, controller 312 selects and switches to one of the REGEN or BOOST pedal modes described elsewhere herein. (During ICE operation, controller 312 and its controlled devices respond to signals arising from gear shifting of the manual transmission, including signals arising from actions the driver takes leading up to the shifting of the gears, as described elsewhere herein.)

Next, at 776, controller 312 reads the speed of the vehicle, torque being delivered to the vehicle by the ICE and battery state of charge. If they are outside of predetermined limits that indicate ET mode is desirable or possible (i.e., answer to question in block 776=no), controller 312 continues operating the ICE at 772 and repeats checking speed, torque and state of charge at 776.

If they are within predetermined limits that indicate ET mode is desirable and possible, (i.e., answer to question in block 776=yes), then controller 312 branches to block 710 to begin switching to ET mode. In an embodiment of the invention, the predetermined limits are as previously mentioned in connection with decision block 730.

It should be understood that although a manual override is not shown here for manually causing a switch from ICE mode to ET mode, controller 312 includes this logic feature in a fashion like that of logic block 728 and monitors continuously or frequently for a manual override signal from the driver in an embodiment of the invention, so that controller 312 will respond to manual override at any time it may occur during ICE mode of operation. In another embodiment of the invention the manual override feature is not accessible to the operator, or else is not included at all. In one embodiment, this feature can only be enabled in certain geographic zones such as in a port, and is enabled responsive to a GPS signal input to controller 312.

From the forgoing it should be understood that in an embodiment of the invention the vehicle only operates briefly with both the ICE and the ET vehicle concurrently propelling the vehicle, i.e., this occurs when transitioning from ICE to ET mode and vice versa, and otherwise only occurs if the propulsion battery is overcharged.

As mentioned previously, at any given time, controller 312 generates signals 312_S_ET and 312_S_ICE at least partly responsive to a pedal response mode that is in effect at that time. As also previously mentioned, controller 312 may interpret the position of accelerator pedal 602 such that a first range of less pedal displacement is deemed by controller 312 to be a REGEN range. In an upper range of greater pedal displacement, the pedal position is deemed by controller 312 to be within an ACCEL range. In an intermediate range between the REGEN and ACCEL ranges of displacement, the pedal position is deemed by controller 312 to be within a DEADBAND range. Following is a table that explains the above mentioned pedal response modes in some detail and relates them to system modes.

| SYSTEM MODE | PEDAL RESPONSE MODE | WHEN | COMMAND TO ICE | COMMAND TO ETMG |
|---|---|---|---|---|
| | | MODE TABLE | | |
| ET | ET | In ET mode or transitioning between modes | Accel torque proportional to basic pedal position signal within ACCEL range/10 only when transitioning. Else not used. | Accel or regen torques both proportional to basic pedal position signal |
| ICE | REGEN quickly | Battery SOC is very low | Accel torque proportional to basic pedal position signal within ACCEL range | Full regen torque * |
| ICE | REGEN efficiently | Battery SOC moderately low | Accel torque proportional to basic pedal position signal within ACCEL range | 0.75 * Full regen torque when pedal is in ACCEL range; In REGEN range: 0.75 * Full regen torque or else regen torque proportional to basic pedal position signal, whichever is higher * |
| ICE | REGEN only off pedal | Battery nearly charged | Accel torque proportional to basic pedal position signal within ACCEL range | No regen torque when pedal in ACCEL range; accel torque proportional to basic pedal |

-continued

MODE TABLE

| SYSTEM MODE | PEDAL RESPONSE MODE | WHEN | COMMAND TO ICE | COMMAND TO ETMG |
|---|---|---|---|---|
| | | | | position signal when in REGEN range * |
| ICE | BOOST | Battery overcharged Use stored energy for ET w/o turning off ICE | Accel torque proportional to basic pedal position signal within ACCEL range | Accel or regen torques both proportional to basic pedal position signal |
| SYNCHRO | SYNCHRO | ICE initial turn on interval (which may be due to automatic mode switching) | Rev up ICE to a predetermined speed (RPM), independent of pedal position within ACCEL range | Accel or regen torques both proportional to basic pedal position signal |
| SYNCHRO | SYNCHRO BLEND | After SYNCHRO pedal mode above | Blends predetermined demand component of 500 RPM signal to ICE (see SYNCHRO pedal mode) with a component generated relative to pedal position. | Accel or regen torques both proportional to basic pedal position signal |
| GEAR SHIFT SYNCHRO | GEAR SHIFT SYNCHRO | Gear shifting during ICE initial turn on interval | Rev up ICE to a predetermined speed (RPM), independent of pedal position | Regen torque proportional to basic pedal position signal divided by 16 when pedal in REGEN range; Accel torque proportional to basic pedal position signal divided by 4 when in ACCEL range |
| GEAR SHIFT ICE | GEAR SHIFT ICE | In ET mode (or transitioning to ET mode) and shifting gears | Accel torque proportional to basic pedal position signal within ACCEL range/10 | Regen torque proportional to basic pedal position signal divided by 16 when pedal in REGEN range; No acceleration torque when pedal in ACCEL range |
| GEAR SHIFT ET | GEAR SHIFT ET | In ICE mode and shifting gears | Accel torque proportional to basic pedal position signal within ACCEL range | Regen torque proportional to basic pedal position signal divided by 16 when pedal in REGEN range; Accel torque proportional to basic pedal position signal divided by 4 when in ACCEL range |

* (except on initial movement)

Figure 8:
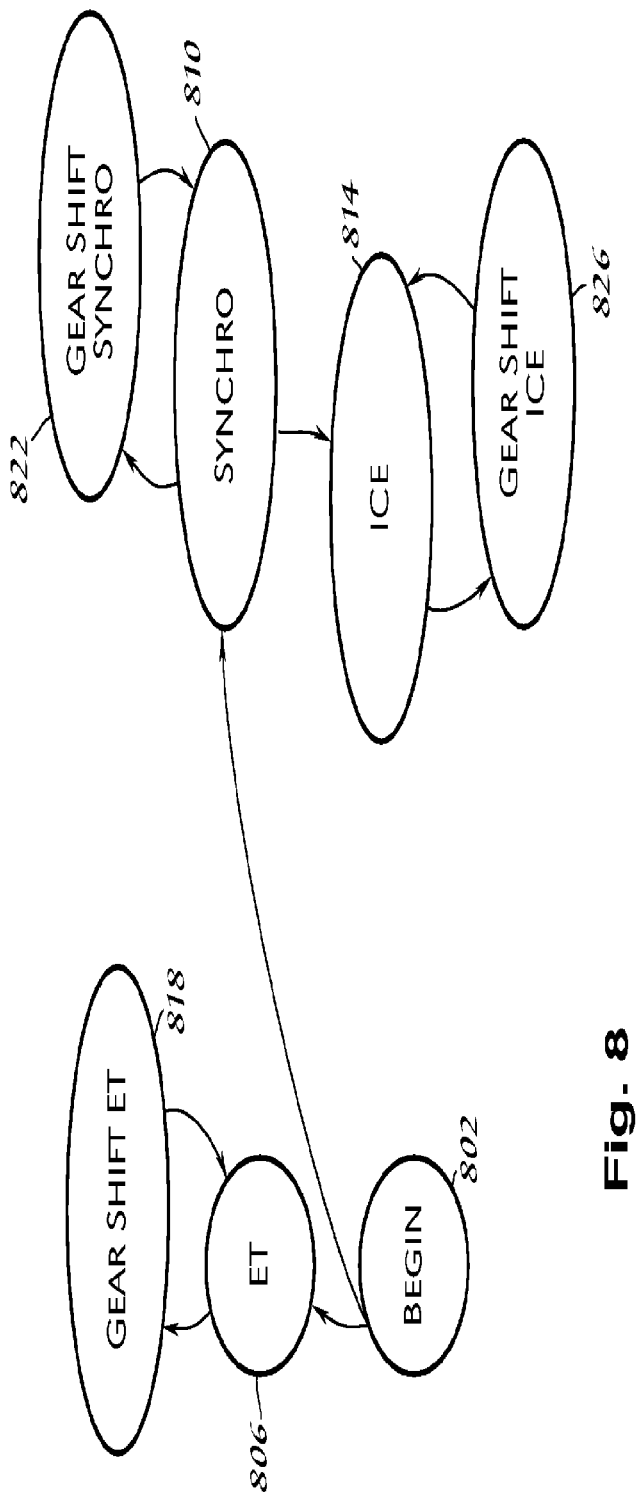
FIG. 8 is a state diagram of stated used in disclosed embodiments.

Referring now to FIG. 8, a state diagram 800 is shown for the system modes of controller 312 and its related sensors and controlled devices, according to an embodiment of the present invention, and relates the system modes to the pedal response modes. (Herein, "modes" are also referred to herein as "control states" or simply "states.") The state of the system begins at initial mode 802, upon startup of the vehicle. Depending on whether the battery has an adequate charge state, as described in FIG. 6 herein above, the next state upon startup is either ET mode 806 or else SYNCHRO mode 810. Preferably, the controller 312 switches the vehicle to ET operating mode 806 (via controller 312 coupled devices), in which the controller energizes the ETMG to operate as a motor, in a manner such as described in FIG. 7. (ET operating mode state 806, as shown in FIG. 8, corresponds to pedal response mode ET described in the Mode Table.)

With reference to the ET mode in the Mode Table, it may be seen that when initially transitioning to this mode 806 in the described embodiment of the invention, controller 312 communicates a value for the 312_S_ICE signal to the ICE that is proportional to the basic pedal position signal within the ACCEL range/10, whereas the value of 312_S_ET communicated to the ETMG is proportional to the basic pedal position signal. (Note, however, with reference to FIG. 7, block 716, that the ICE ignition is disabled by controller 312 early in the ET mode of operation 806. The Table also refers to this feature in terms of the "transition" to ET mode. Signal 312_S_ICE to the ICE will, of course, have no effect once the ICE ignition is disabled.)

The reason for generating signal 312_S_ET proportional to the basic pedal position in ET mode is, of course, to provide a way for the driver to control acceleration and deceleration via the ETMG as motor (acceleration) and as generator (regenerative braking) The reason for generating the 312_S_ICE signal proportional to the basic pedal position signal within the ACCEL range/10 is in order to provide more seamless switching between modes. That is, is in order to provide more seamless switching between modes. That is as the clutch is disengaged signal value to the ICE controller is reduced proportionally to pedal input while signal value to the EMG is increased proportionally to pedal input. This allows the driver to intuitively adjust for the changing torque inputs to the drive train without loss of momentum or over-revving of the ICE. An RPM detection algorithm can also be employed with detects increase in ICE rpm that is not responsive to pedal input, thus indicating that the clutch is disengaged an signaling immediate deactivation of the ICE.

To provide a specific example, if the driver depresses accelerator pedal 602 such that it is within the ACCEL range, for example, the value of signal 312_S_ICE sent to the ICE is proportional to the position of pedal 602 within the ACCEL pedal range divided by 10. Still more particularly, for the pedal ranges described herein above, if pedal 602 is depressed to about 60% of its full range, for example, this is about 20% of the ACCEL range, so the value of signal 312_S_ICE that controller 312 generates and sends to the ICE is 20%/10=2%.

On the other hand, the value of signal 312_S_ET sent to the ET is proportional to the basic pedal position signal, as previously pointed out. Thus, for the example given in which pedal 602 is depressed to about 60% of its full range, which is about 20% of the ACCEL range, the value of signal 312_S_ET that controller 312 responsively generates and sends to the ETMG thus demands 20% of the ETMG motor torque propelling the vehicle.

In another example, in ET mode 806, if pedal 602 is depressed to about 16% of its full range, which is about 50% of the REGEN range, the value of signal 312_S_ET that controller 312 responsively generates and sends to the ETMG thus demands 50% of the ETMG generator torque recharging the propulsion battery. However, all this regeneration torque must come from the momentum of the vehicle, or else there is actually no torque available to regenerate. Note that the signal 312_S_ICE that controller 312 generates and sends to the ICE is 0% for any position of pedal 602 within the REGEN and DEADBAND ranges Shifting Gears in ET Mode Once in ET mode 806, the driver may accelerate and manually shift gears of the manual transmission gear box. As previously mentioned, the driver will depress button 622 to signal controller 312 that he/she is about to shift gears. Responsive to receiving this signal, controller 312 switches to GEAR SHIFT ET state 818, which corresponds to the pedal response mode of the same name in the Mode Table.

With reference to the GEAR SHIFT ET mode in the Mode Table, it may be seen that the value of 312_S_ET that controller 312 communicates to the ETMG in GEAR SHIFT ET state 818 is proportional to the basic pedal position signal divided by 4 if the pedal is within the ACCEL range, and proportional to the basic pedal position signal divided by 16 if the pedal is within the REGEN range. This is for reasons described herein regarding GEAR SHIFT SYNCHRO mode 822.

It should also be noted that in GEAR SHIFT Et mode 818 controller 312 communicates a value of signal 312_S_ICE to the ICE that is proportional to the basic pedal position signal within the ACCEL range/10. This signal has no effect in ET mode.

Controller 312 is configured in this fashion regarding the 312_S_ET signal for two reasons. First, if pedal 602 is in the ACCEL range and thereby demanding propulsion torque from the ETMG (motoring), once the gear box gears are shifted to neutral the ETMG will be unloaded by the transmission. The ETMG would tend to spin up the ETMG quickly to a high speed responsive to the torque demand signal 312_S_ET if the signal were not attenuated. Second, if pedal 602 is in the REGEN range and thereby demanding generation torque from the ETMG (generating), the ETMG would tend to quickly slow down the transmission input once the transmission input is disconnected from the transmission output by shifting the gearbox gears to neutral. Either tendency would have the effect of making it difficult to place the transmission in the next desired gear. This, again, would be caused by the ETMG's much more rapid response to the not-attenuated torque demand signal Z10_S_ET than would be typical of a diesel engine. This, again, would be caused by the ETMG's much more rapid response to the not-attenuated torque demand signal Z10_S_ET than would be typical of a diesel engine.

Thus, to provide a specific example, if the driver depresses accelerator pedal 602 such that it is at 20% of the ACCEL range, for example, the value of signal 312_S_ET that controller 312 generates and sends to the ETMG is 20%/4=5%, thus demanding 5% of the ETMG motor torque to propel the vehicle and the value of signal 312_S_ICE that controller 312 generates and sends to the ICE demanding 20%/10=2% of the ICE torque to propel the vehicle (if the ICE ignition has not yet been disabled, per FIG. 7, 716, as previously discussed).

And if the driver depresses accelerator pedal 602 such that it is at 20% of the REGEN range, for example, the value of signal 312_S_ET that controller 312 generates and sends to the ETMG is 20%/16=1.25%, thus demanding 1.25% of the ETMG generator torque to slow the ETMG spin rate during the time the transmission is between gears.

Releasing the gear shift button 622 ends the GEAR SHIFT ET state. Once the driver has place the shifter in the next gear position he/she releases the button on the gearshift to make available the full torque or regen available from the EMG according the signal values in the basic pedal position to propel or slow the truck.

In another embodiment of the invention, in GEAR SHIFT ET state 818 controller 312 communicates a slight regen signal to the EMG. This signal causes the EMG to slightly slow the ET drive system to imitate the slight slowing that an ICE will exhibit during shifting. (It should be noted that the slight regen signal will also compensate for the greater mass of the PXU with would tend to carry more inertia than the spur gear normally would. This slight regen effectively electronically subtracts the extra inertia.)

Responsive to the system determining that it is appropriate to switch from ET mode 806 to ICE mode 814, controller 312 first switches the vehicle to SYNCHRO operating mode 810 (via controller 312 coupled devices) responsive to conditions described in FIG. 7, block 752. This mode is of short duration. SYNCHRO operating mode 810 in FIG. 8 corresponds to the pedal response mode of the same name in the above table. In SYNCHRO mode 810, controller 312 sends signal 312_S_ICE to ICE independent of position pedal 602. The signal 312_S_ICE communicates a predetermined demand that causes the ICE to rev up to a speed, such as 1200 RPM, that is appropriate for matching the rotational speed of the transmission input shaft, so that the manual transmission gearbox gears can mesh without clashing. Also, for the short while that SYNCHRO mode lasts, controller 312 continues to generate signal 312_S_ET and send it to the ETMG in the same manner as in ET mode 806. This is in order to avoid a loss of torque for propelling the vehicle during the transition until such time as controller 312 determines that the ICE has sufficiently taken over.

SYNCHRO mode 810 ends by controller 312 entering a BLEND pedal response mode, which corresponds to FIG. 7, block 764, in which controller 312 blends the predetermined demand component of 312_S_ICE signal with a component generated relative to pedal input. That is, during a short predetermined time interval of a few seconds, controller gradually decreases the predetermined demand component while gradually increasing the component generated responsive to pedal position. In this manner a smooth transition from EMG propulsion to ICE propulsion is achieved without over-revving the engine or causing an under revved engine to cause slowing of the vehicle or excessive stress to the OEM clutch.

Shifting Gears in SYNCHRO Mode

It is possible, however unlikely, that during the short time when in the SYNCHRO mode the driver may be shifting gears. If this occurs, then responsive to the receiving the signal from button 622, controller 312 switches 21 to GEAR SHIFT synchro mode 822, which corresponds to the pedal response mode of the same name in the Mode Table. With reference to the GEAR SHIFT synchro mode in the Mode Table, it may be seen that in this mode 822, controller 312 automatically generates signal 312_S_ICE in the same manner as described above regarding SYNCHRO mode 810, and automatically generates signal 312_S_ET in the same manner as described above regarding GEAR SHIFT ET mode 806. This is so that inputs from synchro mode do not cause over reaction by either the ICE or EMG which could result in waste of energy or fuel, damage to either system, or difficulty in shifting.

Switching to ICE Mode

Once the conditions for ICE state 814 have been established, as described leading up to block 772 in FIG. 7 (which corresponds to ICE state 814), controller 312 switches the vehicle from SYNCHRO operating mode 810 to ICE mode 814 (via controller 312 coupled devices), which corresponds to the set of pedal response modes labeled REGEN quickly, REGEN efficiently, REGEN only off pedal, and BOOST in the Mode Table. When in ICE mode 814, controller 312 selects one of these pedal response modes responsive to battery state of charge. See Mode Table herein for a description of operation in each of the REGEN quickly, REGEN efficiently, REGEN only off pedal, and BOOST pedal response modes.

Switching Gears in ICE Mode

When in ICE mode 814, controller switches to GEAR SHIFT ICE mode 826 responsive to driver actuation of button 622 and switches out of mode 826 and back to ICE mode 814 responsive to release of button 622. Operation in GEAR SHIFT ICE mode 826 is similar to that described in GEAR SHIFT ET mode 818 except as indicated in the MODE TABLE herein.

Substitute electric-only AC compressor, power steering pump, and air compressor for brakes According to an embodiment of the present invention, the ET system addresses conventional auxiliary equipment that is necessary for operation of the vehicle and for driver comfort (air conditioning compressor, power steering pump, air compressor for brakes). An arrangement for this has been disclosed in one or more of the above cited, related applications. In another arrangement, according to an embodiment of the present invention, drivers powered by the ICE for these subsystems are replaced with electrical drivers having improved efficiency. They are powered by the same battery that provides propulsion in the ET mode. These drivers are turned on and off, as needed, but operate at times both when the ICE is on and when the ETMG is motoring.

Regarding the A/C system in particular, OEM AC compressors are massive, belt driven, and inefficient. Further energy losses are present even when the AC compressor is not running, as the ICE still spins the pulley via the belt. Research for the present invention indicates that converting to an electric-driven AC compressor results in substantial fuel savings both in ET and ICE modes. Likewise, conventional ICE-driven power steering fluid pump and brake air compressor pump shaft both spin and bypass fluid/air even during periods of no demand, resulting in continuous loss of energy from the system. According to an embodiment of the present invention, all of these auxiliary system drivers are removed from the OEM configuration and replaced by high-efficiency electrical drivers, which saves ICE power. The replacement electrical drivers are powered by a controller supplied from the ET propulsion battery and is capable of independently controlling each driver to ensure it is powered only when needed for operation according to its purpose.

Type of Electric Drivers and Type of Driven Devices

Research and testing for the present invention has involved optimizing, or at least more nearly optimizing, how to most efficiently capture energy from the ICE, store it, and then re-use it for propulsion. Accordingly, attention has been directed, as described above, to replacing auxiliary drivers with electric-only drivers. In addition, attention has also been directed to the type of electric-only drivers and the type of auxiliary devices that are driven. In HDV's 12V systems are the norm, for a variety of reasons, including initial cost. A few manufacturers use 24 vdc for starting, but the rest of the system is 12vdc. However, the electric-only auxiliary drivers in an embodiment of the present invention are 240V devices, which are more efficient than conventional 12V drivers. Further, in an embodiment of the present invention the AC compressor itself has been replaced with a scroll-type compressor, which has higher efficiency.

Alternator

The conventional 12V battery-recharging-alternator also draws some energy from the ICE even when the 12V battery is at full charge. According to an embodiment of the present invention, the conventional alternator is likewise removed. Correspondingly, in an embodiment of the present invention, the ETMG is used to charge the conventional 12V battery via the ET system controller, which is also contrary to intuition for the same reason explained herein above. Since the 12V alternator is removed, the ET system controller includes a 12V power supply fed by the ET system battery and the ET system ETMG, where the 12V power supply is tasked with keeping the conventional 12V truck batteries charged for use in operation of the remaining 12V systems of the vehicle.

Power Steering

According to an embodiment of the present invention, a sensor is included and configured to detect steering wheel or steering linkage movement or position. In one aspect of the present invention, the sensor causes the power steering pump driver to be energized responsive to the sensor detecting movement in the wheel or linkage. In another aspect, a control circuit receives the sensor input and the control circuit causes the power steering pump driver to be de-energized responsive to a predetermined time interval during which the sensor detects no movement in the steering wheel or linkage. In another aspect, the control circuit also receives a signal indicating the vehicle speed and the control of the energizing and de-energizing of the power steering pump responsive to movement or no movement, as just described, is further responsive to the control circuit detecting that the vehicle is traveling at a speed below a predetermined limit, which includes not traveling at all. In another aspect, the sensor detects whether the steering linkage is or is not steering the vehicle straight ahead (or within a predetermined range near straight ahead), such that the detected movement is a movement indicating that the vehicle steering is changing from a first position substantially straight ahead to a second position not substantially straight ahead, or from the second position to the first. Accordingly, in one embodiment of the invention the control circuit is configured to cause the power steering pump driver to be de-energized responsive to a predetermined time interval during which the sensor detects the steering position remains substantially straight ahead, i.e., straight ahead or within a predetermined range on either side of straight ahead. With such an arrangement, energy used to drive a conventional power steering pump is reduced.

In an embodiment of the invention, the ICE pulley driven power steering fluid pump is removed or bypassed completely. The electric driven power steering fluid pump is activated by motion of the steering wheel, measured by a mechanical gear attached to the steering column. When the controller senses that the steering wheel position is different from the average steering wheel position over the last second, the controller turns on the power steering pump. If the position doesn't change or if the steering position is straight, the controller starts counting and turns the pump off the count reaches 2.5 seconds.

Air Pressure

For air pressure, the controller receives a signal from a pressure transducer and turns on the air compressor whenever needed. Alternatively, the controller receives input from a high pressure switch and a low pressure switch, and turns on the compressor until the pressure is high, then turns off the compressor until the pressure is low. DOT requires that a certain minimum air pressure is maintained in a tank and that the control system must be able to replace it within a fixed time frame should it fall below that minimum level can In an embodiment of the invention the controller monitors and decides based on energy efficiency whether to run a fixed lower speed or quick charge the brake air system. In an embodiment of the invention, the controller makes decisions based on energy charge, tank pressure, etc, and optimizes all choices to maximize energy usage.

It should be appreciated from the foregoing that according to an embodiment of the invention an electric traction system as described herein is retrofitted to a vehicle such as a class 8 HDV. The retrofit system provides adequate drive time and drive performance for a predetermined day truck drive cycle by matching i) PXU, ET motor/generator and transmission gearing, ii) ET motor/generator speed/torque characteristic, and iii) battery characteristic to deliver torque to mechanical drive train in ET mode within predetermined speed and torque limits for the ETMG, PXU and transmission, while also providing recharge of battery in ICE mode responsive to predetermined features of the drive cycle and within speed and torque limits of the PXU and transmission and speed, torque and current limits of the ETMG and battery system.

That is, the system specifically has a combination of gear ratios, ETMG torque, etc. that satisfies predetermined torque and speed constraints within predetermined drive cycle constraints, i.e., predetermined patterns of speeds and time intervals, wherein the system has a battery of sufficient capacity to yield a predetermined drive time and speed pattern, and the ETMG (as generator) can recharge the battery within predetermined recharge opportunities defined in the time and speed drive cycle. That is, the battery has sufficient current and ampere-hour capacity to yield a predetermined drive time within the predetermined drive cycle where the ETMG (as generator) can recharge the battery within predetermined recharge opportunities defined in the drive cycle.

Relative to the size and weight of a class 8 HDV, a relatively small electric ETMG propels the vehicle via a PTO port that is designed for a different purpose. While the ETMG is relatively small in terms of what is needed to move the truck in all circumstances, e.g., above certain speeds, the ETMG has operating characteristics that exceed the limits of a conventional PTO that is ordinarily coupled to a transfer gear of the conventional transmission through a PTO port. That is, the ETMG must have the capacity to drive or be driven at higher torques and speeds in certain situations than a conventional PTO can withstand. Accordingly, a PXU having a combination of both a high torque rating and a high speed rating is included in an embodiment of the present invention. Moreover, conventional PTO's do not have a sufficiently high gear ratio to enable the present invention. Accordingly, the PXU not only has a high speed and torque rating, but also has a higher gear ratio. Further, the recharge current/voltage delivered by the ETMG in generator mode (ET mode) must also be switched off or at least reduced in connection with manual shifting.

Figure 9:
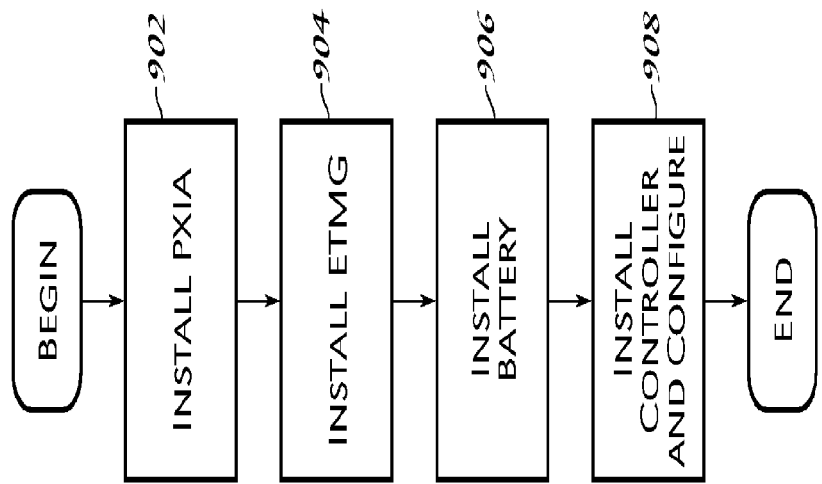
FIG. 9 is a flow diagram of method steps of retrofitting a vehicle, according to embodiments of the invention.

Referring now to FIG. 9, it should also be understood that the invention may include a method of retrofitting a vehicle. In an embodiment of the invention, this includes installing 902 a power exchange unit (PXU) coupled to an existing manual transmission of the vehicle via a PTO port; installing 904 an electric motor generator coupled to the PXU; installing 906 a battery electrically coupled to the motor generator for supplying power to propel the vehicle; and installing 908 a control unit coupled to the motor generator and the battery and configured to switch operation of the vehicle between first and second modes, wherein in the first mode an internal combustion engine of the vehicle propels the vehicle, and in the second mode the motor generator propels the vehicle in a motoring mode. Installing 908 the control unit may include configuring the control unit as described herein.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

What is claimed is:

1. A method of retrofitting a vehicle comprising:
   installing a power exchange unit (PXU) coupled to an existing manual transmission of the vehicle via a PTO port;
   installing an electric motor generator coupled to the PXU;
   installing a battery electrically coupled to the motor generator for supplying power to propel the vehicle;
   installing a control unit coupled to the motor generator and the battery and configured to switch operation of the vehicle between first and second modes, wherein in the first mode an internal combustion engine of the vehicle propels the vehicle, and in the second mode the motor generator propels the vehicle in a motoring mode.

2. In a vehicle with a manual transmission having a transfer gear accessible via a power take off (PTO) port, a retrofit apparatus comprising:
   an electric traction motor-generator (ETMG) mechanically coupled to the transmission transfer gear via a power exchange unit (PXU) through the PTO port, the ETMG electrically connected to a battery; and
   a controller configured to operate the vehicle in i) an internal combustion engine mode (ICE mode), wherein the ICE provides mechanical power via the transfer gear and the PXU to the ETMG for driving the ETMG as an electric generator to produce and store an electrical charge in the battery, and ii) an electric traction motor mode (ET mode), wherein the ICE is powered off, and the stored electrical charge from the battery energizes the ETMG as an electric motor to provide mechanical power via the transfer gear and the PXU to the manual transmission for propelling the vehicle, wherein the controller is configured to automatically switch operation of the vehicle between ICE and ET modes, and wherein the controller is configured to automatically switch operation of the vehicle between ICE and ET modes responsive to predetermined driving and battery conditions.

3. The retrofit apparatus of claim 2, wherein the transmission has an oil pan below a housing of the transmission, the oil pan being bolted to the housing of the transmission via oil-pan-bolt-holes in the housing, and wherein the retrofit apparatus comprises:
   a bracket bolting the PXU to the housing of the transmission, the bracket configured to fit over the oil pan and encompassing holes configured to align to the oil-pan-bolt-holes.

4. The retrofit apparatus of claim 2, wherein the predetermined driving conditions include vehicle speed below 18 MPH and a drive train torque condition below 150 ft. lbs., and the predetermined battery condition includes a state of charge of the battery above 40%.

5. The retrofit apparatus of claim 2, wherein the predetermined driving conditions include vehicle speed below 40 MPH and a drive train torque condition below 150 ft. lbs., and the predetermined battery condition includes a state of charge of the battery above 30%.

6. The retrofit apparatus of claim 2, wherein the controller is configured to switch operation of the vehicle to the ICE mode to recharge the battery responsive to an input indicating that the vehicle has a heading toward a geographic zone where ICE operation is limited by a regulatory authority.

7. The retrofit apparatus of claim 2, wherein the controller is configured to automatically switch operation of the vehicle between the ET mode and the ICE mode responsive to the vehicle traveling at a predetermined vehicle speed.

8. The retrofit apparatus of claim 7, wherein the controller is configured to select the predetermined vehicle speed of switching in response to receipt of a manual input or a measurement of a vehicle load.

9. The retrofit apparatus of claim 2, wherein the controller is configured to determine vehicle load responsive to receipt of a predetermined measurement from a strain gauge or a predetermined pattern of vehicle traveling speed.

10. The retrofit apparatus of claim 9, wherein predetermined pattern of vehicle traveling speed includes a measured time between predetermined vehicle speeds with the transmission operating in a predetermined shifting gear.

11. The retrofit apparatus of claim 2, wherein the controller is configured to automatically switch operation of the vehicle between the ICE mode and the ET mode responsive to a predetermined torque measured in a drive train of the vehicle.

12. The retrofit apparatus of claim 2, wherein the controller is configured to automatically switch operation of the vehicle between the ICE mode and the ET mode responsive to a state of charge stored in the battery.

13. The retrofit apparatus of claim 2, wherein the PXU comprises one or more gears providing a fixed gear ratio between the transmission transfer gear and the ETMG, so that the ETMG operates as the electric generator and the electric motor over essentially the same speed range.

14. The retrofit apparatus of claim 2, wherein a gear ratio between the ETMG and the transmission transfer gear is in a range of 2.0:1 to 2.5:1.

15. The retrofit apparatus of claim 13, wherein the fixed gear ratio is such that for a range of 0 to a predetermined full speed ICE rotation, the ETMG operates in a range of 0-4000 RPM the fixed gear ratio is configured to operate the ETMG in a range of 0-4000 RPM in the mode.

16. the retrofit apparatus of claim 2, wherein the PXU has a torque rating of at least 500 ft-lbs and a speed rating of at least 5000 RPM.

17. The retrofit apparatus of claim 2, wherein the PXU has a torque rating of at least 735 ft-lbs and a speed rating of at least 4500 RPM.

18. The retrofit apparatus of claim 2, wherein the ETMG is permanently coupled to the one or more gears of the PXU.

19. The retrofit apparatus of claim 2, wherein the controller is configured to deliver an ICE demand signal to the ICE and an ET demand signal to the ETMG responsive to a sensed determination of a physical position of an accelerator pedal, the controller further configured to modify deliveries of the ICE demand signal and the ET demand signal as a function of a received signal indicating a shifting gear transitioning state of the manual transmission, in order to facilitate a smooth transition between selected shifting gears.

20. The retrofit apparatus of claim 2, wherein the controller is configured to deliver an ICE demand signal to the ICE and an ET demand signal to the ETMG responsive to a sensed determination of a physical position of an accelerator pedal, and wherein within a predetermined range of physical positions of the accelerator pedal, the controller is configured to respond to the physical position of the accelerator pedal for generating a first set of the demand signals, and within another predetermined range of physical positions of the accelerator pedal, the controller is configured to respond to the physical position of the accelerator pedal for generating a second set of the demand signals, wherein the first set causes the ETMG to generate electrical power and the second set causes the ETMG to generate mechanical torque.

21. The retrofit apparatus of claim 2, wherein the vehicle has a clutch coupled between the ICE and the transmission, and the controller is configured to switch to the ICE mode from the ET mode according to an automatic sequence that includes i) increasing rotational speed of the ICE to at least a predetermined fixed rotational speed by generating a fixed speed ICE demand signal component in order to match rotational speed of the transmission and ii) engaging the clutch responsive to detecting the predetermined ICE rotational speed.

22. The retrofit apparatus of claim 21, wherein the controller is configured to respond to a sensed determination of a physical position of an accelerator pedal and to operate in a synchro blending mode after the controller causes the clutch to engage, wherein in the synchro blending mode the fixed speed ICE demand signal component is blended for a predetermined time with an ICE demand signal component generated by the controller responsive to the physical position of the accelerator pedal.

23. The retrofit apparatus of claim 22, wherein the controller is configured to operate in an ICE control mode after the synchro blending mode, wherein in the ICE control mode the controller generates the ICE demand signal responsive to the physical position of the accelerator pedal position and generates an ET demand signal to control charging of the battery by the ETMG, wherein the ET demand signal in the ICE control mode depends on a state of charge of the battery and the physical position of the accelerator pedal position, except that if the battery is below a predetermined state of charge the ET demand signal in the ICE control mode demands at least a fixed amount of charging by the ETMG independently of the accelerator pedal position.

24. The retrofit apparatus of claim 19, wherein the apparatus includes a manual signaling device on a shift lever of the manual transmission for initiating the shifting gear transitioning signal.

25. The retrofit apparatus of claim 19, wherein the controller is configured to respond to detecting the shifting gear transitioning signal initiated by the manual signaling device by attenuating a response of the controller to the physical position of the accelerator pedal for generating the ICE or ET demand signal.

* * * * *